(12) United States Patent
Norum et al.

(10) Patent No.: US 7,093,511 B2
(45) Date of Patent: Aug. 22, 2006

(54) TRANSMISSION

(75) Inventors: Viggo L. Norum, Kongsberg (NO); Lars Lein, Kongsberg (NO); Geir Huseby, Vestfossen (NO); Gunter Hirt, Kongsberg (NO); Reinhard Berger, Bühl (DE); Carsten Bünder, Bühlertal (DE); Boris Serebrennikov, Bühl (DE); Jörg Metzger, Bühlertal (DE); Robert Fischer, Bühl (DE); Burkhard Pollak, Bühl (DE); Gerd Ahnert, Sasbach (DE)

(73) Assignee: LuK Lamellen und Kupplungsbau Beteiligungs KG, Bühl (DE)

( * ) Notice: Subject to any disclaimer, the term of this patent is extended or adjusted under 35 U.S.C. 154(b) by 0 days.

(21) Appl. No.: 10/646,529

(22) Filed: Aug. 23, 2003

(65) Prior Publication Data

US 2004/0112158 A1 Jun. 17, 2004

Related U.S. Application Data

(63) Continuation of application No. PCT/DE02/00577, filed on Feb. 18, 2002.

(30) Foreign Application Priority Data

| Feb. 23, 2001 | (DE) | ............................... 101 08 990 |
| Mar. 27, 2001 | (DE) | ............................... 101 15 055 |
| Mar. 27, 2001 | (DE) | ............................... 101 15 056 |
| Apr. 24, 2001 | (DE) | ............................... 101 19 879 |
| May 29, 2001 | (DE) | ............................... 101 26 263 |
| Jun. 6, 2001  | (DE) | ............................... 101 27 323 |
| Aug. 24, 2001 | (DE) | ............................... 101 41 610 |

(51) Int. Cl.
*F16H 59/00* (2006.01)
*F16H 61/00* (2006.01)
*F16H 63/00* (2006.01)

(52) U.S. Cl. ........................ 74/335; 74/337.5
(58) Field of Classification Search ............... 74/337.5, 74/567, 473.36, 335
See application file for complete search history.

(56) References Cited

U.S. PATENT DOCUMENTS

| 1,749,837 | A  |   | 3/1930  | Nickell, Jr. ................... 74/334 |
| 1,928,782 | A  |   | 10/1933 | Church ........................ 74/359 |
| 4,432,251 | A  |   | 2/1984  | Malott ........................ 74/337.5 |
| 6,027,426 | A  | * | 2/2000  | Holman ........................ 477/99 |
| 6,234,038 | B1 | * | 5/2001  | Loeffler ................... 74/473.37 |
| 6,439,362 | B1 | * | 8/2002  | Reik et al. ................. 192/3.56 |
| 6,634,247 | B1 | * | 10/2003 | Pels et al. ...................... 74/329 |
| 6,745,878 | B1 | * | 6/2004  | Jensen ...................... 192/3.63 |
| 6,835,157 | B1 | * | 12/2004 | Haka .......................... 475/269 |

FOREIGN PATENT DOCUMENTS

EP  0 149 020 A2  7/1985

\* cited by examiner

*Primary Examiner*—Tisha Lewis
(74) *Attorney, Agent, or Firm*—Alfred J. Mangels

(57) ABSTRACT

A power transmission for a motor vehicle. The transmission includes a plurality of transmission ratio steps defined by pairs of gear carried on parallel shafts, and final output mechanisms for engaging desired transmission ratio steps. The final output mechanisms are operable for controlling the engagement of respective transmission ratio steps to minimize tractive force interruption by allowing rapid gear changes to be effected to reduce the times between shifts of gears. By sensing accelerator pedal position and vehicle speed a new transmission ratio step to be subsequently engaged can be pre-selected while an engaged gear remains engaged.

68 Claims, 25 Drawing Sheets

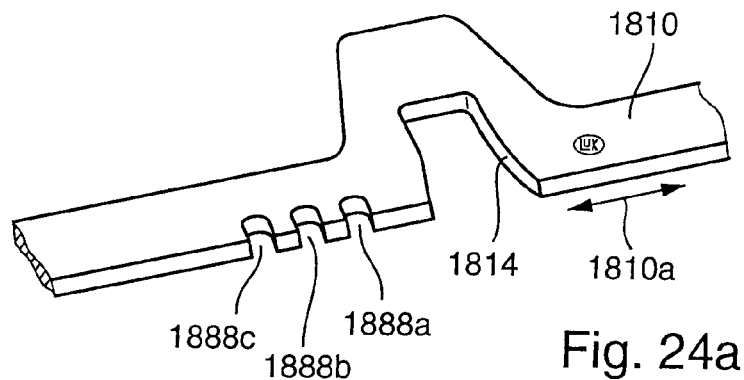
Fig. 24a
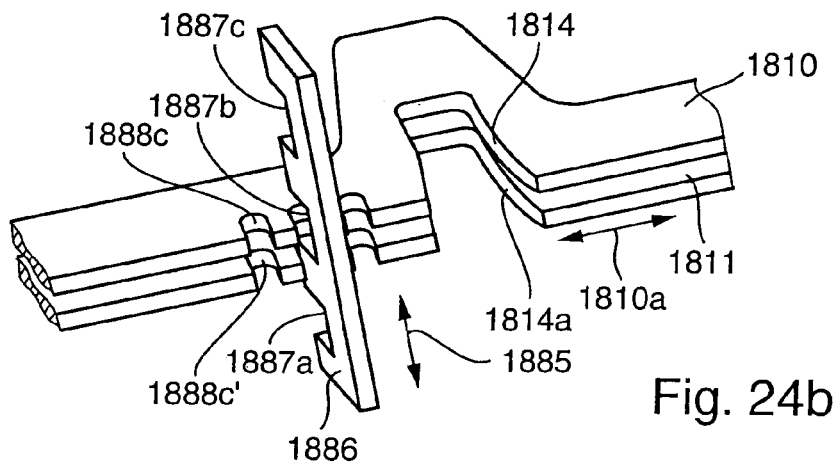
Fig. 24b
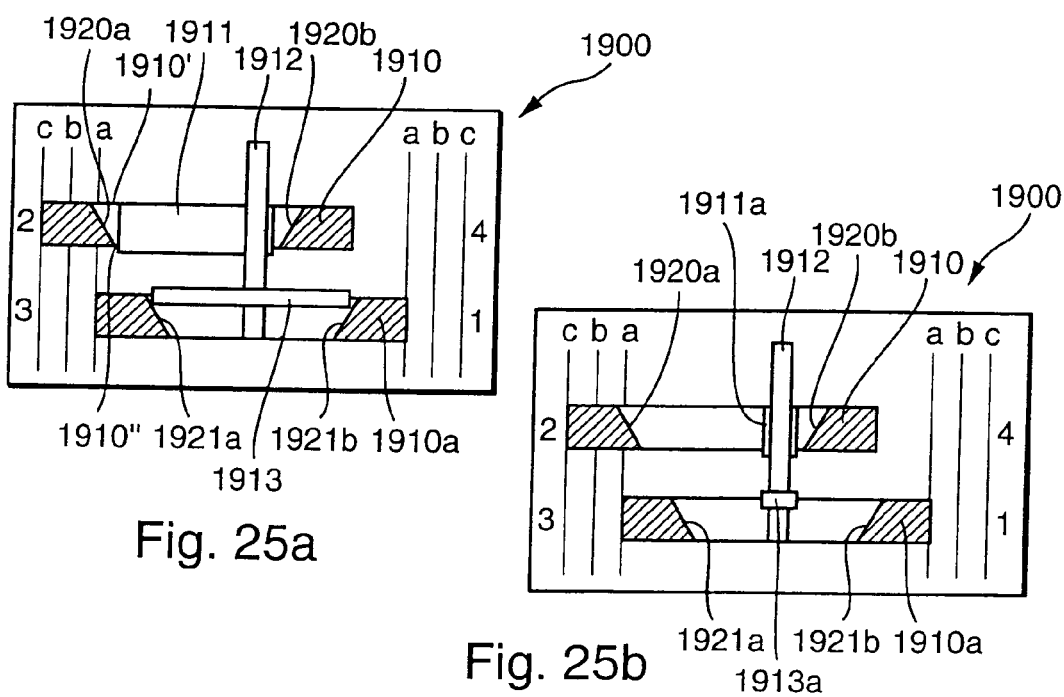
Fig. 25a
Fig. 25b

TRANSMISSION

CROSS-REFERENCE TO RELATED APPLICATION

This application is a continuation of international application serial number PCT/DE02/00577, filed on Feb. 18, 2002, the entire contents of which are hereby incorporated by reference.

BACKGROUND OF THE INVENTION

1. Field of the Invention

The invention relates to a transmission, especially for a motor vehicle. More particularly, the invention relates to a transmission that has a plurality of sets of gears forming transmission ratio steps, wherein the gear sets are each formed by one gear that is non-rotatably carried on one shaft and by an idler gear connectable with another shaft, whereby transmission ratio steps can be selected, and in which an idler gear is connected with its associated shaft by an output element that is part of a final output mechanism that is actuated by a final actuation mechanism, whereby the selection sequence of the transmission ratio steps is not established in the final actuation mechanism.

2. Description of the Related Art

A final output element is the element that is moved in order to set a transmission ratio condition. That is, it is the element, such as, for example, a coupling sleeve, that produces the connection between two power transmission means. The final output element is part of the final output mechanism, which includes adjacent to the coupling sleeve a shift fork, for example, which is connected with the coupling sleeve and is movable by a shift finger that can be operatively connected with it so that the coupling sleeve is moved to engage or disengage a transmission ratio step. The shift finger is part of the final actuation mechanism that actuates the final output mechanism. The entire kinematic chain between the shift or selection actuation and the final output mechanism is designated as the final actuation mechanism.

In state-of-the-art transmissions, the interaction between the final output mechanism and the final actuation mechanism takes place in such a way that engagement of a transmission ratio step can only take place when no other transmission ratio step is engaged. In order to engage a transmission ratio step, all other transmission ratio steps must previously be positively disengaged. The shift fork jaws, with which the shift finger can be connected in order to shift the coupling sleeve with the respective shift fork, are constructed such that the shift finger can only be connected with another shift fork if the coupling sleeve with whose shift fork it is then connected is in the neutral position. In reference to a known manual transmission with an H-shift pattern, that manifests itself in that a selection movement of the gear shift lever from one shift passageway into another can occur only in the neutral passageway, whereby during a shift lever movement from one shift passageway into the neutral passageway the same transmission ratio step that was engaged at the time is disengaged. Moreover, the transmission ratio steps that can be shifted by the same coupling sleeve cannot be selected simultaneously. Consequently, it is necessary in a shift procedure to disengage a previous transmission ratio step, to conduct a selection movement, and then to engage a new transmission ratio step. During that time, the flow of torque is interrupted by a disengaged drive clutch, because the drive branch must be load-free. In the event that selection of a shift passageway is necessary, the shift process turns out to be relatively long, which can be disturbing and relevant to safety, especially with automated shift transmissions with tractive force interruption, for example during passing, turning, and the like.

Especially with load-shiftable transmissions, in which the transmission ratio steps form groups or are assembled into groups between which tractive-force-interruption-free load shifts can be conducted, for example in which the transmission ratio steps are included in different parallel power branches, the various output elements are arranged with a friction clutch so that a continuous change of torque from one branch to another branch can be brought about by an actuation of a friction clutch during gradual changes. Configurations of the connection of the final output mechanism and the final actuation mechanism have become known, which permit engaging one transmission ratio step without having to disengage another transmission ratio step that may already have been engaged. In that way, it is possible to engage several transmission ratio steps simultaneously in several power branches using a single final actuation mechanism by first selecting one transmission ratio step in one branch, then allowing the shift finger to connect with other shift forks—without having to disengage the relevant transmission ratio step—in order to select further transmission ratio steps. In that connection, published German application DE 100 20 821 A1 owned by the applicant is relevant, the contents of which are incorporated in the disclosure of the present application.

Usually two groups of transmission ratio steps are formed, whereby successive transmission ratio steps belong to different groups with respect to the division of their gear ratios. For example, one transmission includes one reverse gear and six forward gears, one group includes gears 1, 3, and 5 and the other groups gears R, 2, 4, and 6.

Such a transmission offers the possibility of selecting one transmission ratio step using the friction clutch in the power branch included in the torque flow, and then engaging in another—still open branch—the transmission ratio step into which a shift is subsequently to take place by diverting the torque flow to the relevant branch. During acceleration, for example, it is possible to shift into fourth gear in one branch during an upshift while in the closed power branch the third gear is engaged. In the event that now suddenly nonetheless a downshift into second gear is to take place, the fourth gear must first be disengaged and then the second gear must be engaged, which in particular causes a very great loss of time if the second and fourth gears must be shifted by different coupling sleeves.

Furthermore, a negative situation can arise for a transmission shift in which, with an open power branch, more than one transmission ratio step is engaged, which represents a very great safety risk because as soon as that branch is tied into the torque flow, several transmission ratio steps with different transmission ratios become operative, which can lead to the transmission becoming blocked or even destroyed.

Additionally, so-called controller drum transmissions have become known, in which the final output mechanisms of the transmission ratio steps are actuated using a rotatable controller drum. For example, link-like grooves are incorporated in the controller drum, which extend circumferentially as well as axially on the surface of the cylindrical controller drum, so that by rotating the controller drum about its longitudinal axis shift forks, which are connected kinematically with the controller drum by means of sliding elements in the grooves, undergo movement in the axial direction of the controller drum. The shift sequence of the transmission ratio steps with reference to the rotation of the selector shaft is established by the shapes of the grooves. By appropriate configuration of the grooves, controller drum transmissions of that type make possible an overlapping disengagement of a previous transmission ratio step and engagement of a new transmission ratio step, whereby a certain time advantage is achieved during a shift process, and consequently the duration of the tractive force interruption can be reduced. Nonetheless, shifts are only possible sequentially. For example, a direct shift from first gear into third gear is just as impossible as a direct downshift from fifth gear into first gear.

An object of the invention is to provide a transmission, for example an automated shift transmission, a load-shifting transmission, a double-clutch transmission, and the like, with transmission ratio steps distributed between at least two different shafts, in which the shift sequence of the transmission ratio steps is not established in the final actuation mechanism, in which shift times are substantially reduced, and safety is substantially improved. The transmission should furthermore have a simple design, with as few components as possible, and be simple to operate without additional safety measures.

SUMMARY OF THE INVENTION

That object of the invention is realized in that in a transmission—in which the final actuation mechanism includes at least one primary actuation element, such as a shift finger, which interacts, for example, by axial displacement of a selector shaft on which it is arranged, which is constructed with the final output mechanisms that are formed, for example, by shift forks and coupling sleeves joined therewith, in such a way that a transmission ratio step can be engaged, for example in that the selector shaft, on which the at least one primary actuation element is arranged, is rotated, and that it can then operatively engage with another final output mechanism without having to disengage the previously-engaged transmission ratio step—the final actuation mechanism includes at least one secondary actuation mechanism. Within the meaning of the invention the final actuation mechanism, having at least one primary and one secondary element, is partially designated as active interlock in the following description. It is to be understood that this concept can be the object of trademark applications and that its trademark significance is not to be considered as restricted.

In accordance with an especially preferred embodiment, as soon as the at least one primary actuation element engages with a final output mechanism, the at least one secondary actuation element, engaged with at least one further final output mechanism, interacts with another final output mechanism. For example, when in a predetermined position, a primary actuation element is connected with a final output mechanism, and thereby at the same time secondary actuation elements are connected with the additional final output mechanisms. Upon actuation of a final output mechanism for engaging a transmission ratio step using the at least one primary actuation element, for example by rotating the selector shaft, the at least one further final output mechanism is advantageously actuated at the same time by the at least one secondary actuation element for disengaging the associated transmission ratio steps. It is particularly useful that only one transmission ratio step can be engaged at a time, and that a considerable time advantage is achieved on the basis of the overlapping disengagement of the previous step and the engagement of the new transmission ratio step as well as on the basis of the already executed selection movement.

In accordance with a further, likewise especially preferred embodiment, in a transmission in which the transmission ratio steps form groups between which a tractive-force-interruption-free change can take place, the at least one secondary actuation element interacts with at least one further final output mechanism of the same group as soon as the at least one primary actuation element operatively engages with a final output mechanism of a group. It is very useful in this embodiment that with an actuation of a final output mechanism of one group for engaging a transmission ratio step by means of the at least one primary actuation element, at the same time the at least one further final output mechanism of the same group is actuated by means of the at least one secondary actuation element for disengaging the associated transmission ratio steps. Advantageously, the at least one secondary actuation element operatively engages with no final output mechanism of the other group, as long as the at least one primary actuation element operatively engages with a final output mechanism of one group. It is very useful that one transmission ratio step is thus engageable in each group at the same time, but not several transmission ratio steps of one group.

In accordance with an exemplary but especially preferred arrangement of the final output mechanisms, the connection elements include shift forks that have a first functional region for engagement of a primary actuation element and a second functional region for engagement of a secondary actuation element, so that each final output mechanism can be actuated by a primary actuation element or by means of a secondary actuation element. Thus, in a transmission, the at least one secondary actuation element is arranged on the selector shaft, which is rotatable about its longitudinal axis upon actuation, and the second functional region is formed such that when the selector shaft is rotated, a force can be transmitted from a secondary actuation element to the second functional region in the disengaging direction of the associated transmission ratio step, which is equal to or greater than the force necessary for disengagement. The connection between the secondary actuation element and the final output mechanism must not be capable of also transmitting a force for engaging a transmission ratio step as well.

In a further embodiment, an arrangement of the at least one secondary actuation element is preferred that makes it possible to connect the secondary actuation element with at least two final output mechanisms. For that purpose, the at least one secondary actuation element has an especially large width in the selector shaft axial direction, which advantageously corresponds at least approximately with the width of two shift fork jaws and their common spacing.

In accordance with an especially preferred embodiment, the at least one secondary actuation element and the second functional regions cooperate such that an engagement of a transmission ratio step occurs upon rotation of the selector shaft independently of the direction of rotation. Proceeding from the initial position, in which the selector shaft is in a middle position with respect to its rotation and also in which the primary actuation element has entered into engagement with the first functional region of a final output mechanism, a transmission ratio step is engaged by rotating the selector shaft either to the right or to the left, whereby in each case the at least one secondary actuation element actuates the associated transmission ratio step(s) in the disengagement sense.

It is regarded as especially advantageous in that embodiment if the at least one secondary actuation element and the second function regions are formed symmetrically.

In an especially preferred embodiment, the at least one secondary actuation element has two cam-like end regions and the second functional regions have corresponding recesses.

In another likewise especially preferred embodiment, the second functional regions have two cam-like end regions and the at least one secondary actuation element has corresponding recesses.

The transmission of force between a secondary actuation element and a second functional region thus takes place through the tips of the cam-like end regions, whereby it is also very appropriate in another embodiment for the transmission of force between the secondary actuation element and the second functional region to take place by means of the side surfaces of the cam-like end regions.

According to a further inventive concept, the final actuation mechanism is such that a defined neutral shift state can be set using a correspondingly-designed secondary actuation element. According to that inventive concept, after engagement of a transmission ratio step the primary actuation element, for example, a shift finger, can be displaced in relation to the final actuation element, for example a shift jaw with an upper shift fork, which means that the information as to which transmission ratio step is engaged cannot be clearly determined on the basis of the position of the primary actuation element. In conventional arrangements in accordance with the state of the art, in which the shift finger cannot be shifted out of the shift jaw after engagement of a transmission ratio step, the neutral position is clear after moving along the neutral passageway. In order likewise to define a clear neutral position for the present invention, a separate shift passageway can be provided, in which a correspondingly-configured secondary actuation element with all final actuation elements, by means of which a transmission ratio step is engaged, enters into interaction and brings about a disengagement of the engaged transmission ratio step. For this, for example, a shift cam, which is lengthened axially in the direction of the selector shaft that receives the primary and secondary actuation elements, can be provided as a secondary actuation element, which at the same time can interact with at least two shift jaws, so that in an axial position of the selector shaft the engaged transmission ratio step can always be disengaged by rotation of the selector shaft. Since hereby only a disengagement of the transmission ratio step and not an additional engagement of a new transmission ratio step has to take place, advantageously the rotation of the selector shaft can take place, compared to a shift between two transmission ratio steps, at substantially smaller rotation angles, for example with a third of the rotation angle. The definition of the rotation angle for setting the neutral position can take place by means of a corresponding control of the actuator for rotating the selector shaft, whereby the information about the axial position of the selector shaft can be coordinated with the neutral position, and corresponding path detection signals of the axial position, for example displacement sensor signals or position signals of the actuator relative to the axial displacement of the selector shaft, can be evaluated. Alternatively, or in addition, a connecting link for restricting the rotation angle for setting a neutral position has proven useful. Setting a defined neutral position is especially advantageous at the startup of an internal combustion engine, during vehicle standstill, and in comparable driving situations. Furthermore, a parking brake function consisting of the blocking of the transmission by simultaneously engaging two transmission ratio steps can be advantageous, whereby the parking brake can again be easily and quickly released by means of the proposed neutral position.

A further advantageous arrangement can be provided for the actuation of a usual parking brake by means of the actuator of the transmission control. Thus, for example, the parking brake can be actuated and deactuated by traversing an additional shift passageway. A first transmission ratio step can additionally be engaged thereby, and then when the transmission ratio step is engaged a parking brake can later be operated in which the shift passageway of the engaged transmission ratio step is exited and the position for activating the parking brake is brought about.

According to a further inventive concept, it can be especially advantageous to install the active interlock in connection with an automated shift transmission whose transmission ratio steps are formed by gear pairs between two shafts, for example a transmission input shaft and a transmission output shaft, whereby during a shift process a clutch separates the drive shaft and the transmission input shaft, and therefore a tractive force interruption occurs during the shift process. Thereby, the phase angle between shift processes, in which the shift passageway is changed, is configured between the primary and secondary actuation elements such that during a shift process disengagement of the engaged transmission ratio step and engagement of the new transmission ratio step overlap. That leads to more rapid shift times and to shorter tractive force interruptions. In conventional systems with one shift finger, which first disengages an engaged transmission ratio step, then changes the shift passageway and thereafter engages a new transmission ratio step, the positive lock to the engaged transmission ratio step is terminated after approximately one third of the overall path of the sliding sleeve, then by the synchronization and by the travel to the neutral stage, and thereafter the positive lock to the new transmission ratio step is formed. The shift process can be shortened according to the inventive concept in that the engagement movement for the new transmission ratio step to be engaged already begins with the primary actuation element when the positive lock for the engaged transmission ratio step is separated, that is, the synchronization of the new transmission ratio step to be engaged begins at practically the same time as the separation of the positive lock of the engaged transmission ratio step.

According to a further inventive concept, a transmission can be provided in such a manner that only a single synchronization device is provided on a gear pair, whereby the synchronization device is actuated after disengagement of the engaged gear by means of a primary actuation element, such as, for example, a shift finger, until a target rotational speed of the transmission input shaft is reached for the new gear to be engaged. After reaching the target rotational speed, the primary actuation element is shifted into the shift passageway of the new gear to be engaged and engages the new gear to be engaged. It is to be understood that different primary actuation elements can be utilized for this process for the synchronization and engagement and disengagement of the gears. This arrangement can in particular be provided for a double-clutch transmission with two transmission paths in such manner that in each transmission path only a single synchronization device is provided for all transmission ratio steps of a transmission path. A more detailed explanation for this is contained in German patent application DE 101 33 695.0, the entire contents of which are hereby incorporated into the present application. The upshift from one transmission ratio step to the other moreover takes place in such a manner that first the torque is reduced on the corresponding transmission path, in that, for example, the clutch to the drive shaft is disengaged, subsequently the engaged gear is disengaged by means of a secondary actuation element or by means of a primary actuation element, and the synchronization device is actuated by means of a primary actuation element in the shift passageway of the highest transmission ratio through a displacement of the corresponding sliding sleeve of the highest transmission ratio step without engaging that gear, and therewith the freely-rotating transmission input shaft is adjusted to the target rotational speed of the new gear to be engaged. After reaching the target rotational speed, the new gear is engaged using the shift finger. An advantageous variant for diminishing the path that the selector shaft covers with the primary and secondary actuation elements, provides for actuation of the synchronization apparatus without an engagement of a primary actuation element into the final output mechanism of the highest transmission ratio step, for example without displacing one of the shift fingers into the shift jaw of the highest transmission ratio step, by incorporating appropriate control elements, such as annular segment tapered sleeves, cams, and the like, on the selector shaft as well as on the final output mechanism, such as the shift fork. During rotation of the selector shaft for disengaging the currently engaged transmission ratio step and/or during an axial displacement of the selector shaft for selecting another shift passageway, those control elements effect a displacement of the final output mechanism, for example the sliding sleeve, of the highest gear in such a manner that the synchronization device is indeed actuated, but that gear is not engaged so that excessive back and forth displacements of the selector shaft can be avoided.

Especially for double clutch transmissions with at least two power branches that are connected independently of each other with the drive unit, such as, for example, an internal combustion engine through a clutch, and in which one power branch transmits the drive torque to the drive wheels by means of a current drive gear, while in the other power branch or branches the drive gear following the current drive gear is already engaged, it can be advantageous to use pre-selection strategies relative to the new gear to be engaged. The pre-selection strategies provide anticipatory selection of the new gear to be engaged, in order to execute the shift as rapidly and as efficiently as possible, for the further course of travel of the motor vehicle desired by the driver, in the event of a shift desire initiated by the driver himself or by the control logic. When a correctly predicted gear is already engaged, the shift perceived by the driver takes place only through the transfer of torque from one power branch to the other by engaging and disengaging the corresponding clutches between the drive shaft of the drive unit and the corresponding transmission input shafts.

An advantage of the present invention is that with the final actuation mechanism, the primary actuation elements can immediately be brought into the neutral position after the shift of a gear in a power branch and need not remain in the shift passageway of the engaged gear. Moreover, in addition to driving technical aspects, safety technical aspects, for example overspeed protection for a new gear, can also be taken into consideration. The following pre-selection strategies can be advantageous:

Engaging the next higher gear: Following a shift process, that is, when the clutch applies torque to the current drive gear of a power branch, the torque will be engaged with the current drive gear and the other, load-free power branch. If there is no higher gear, the highest gear in that branch is engaged. In that way, overspeed protection is ensured while shifting torque to that power branch. A previous, still-engaged gear is disengaged with that shift process by means of the secondary actuation element. The clutch in that power branch remains disengaged until a shift requirement for the engaged gear is triggered by the control logic.

Pre-selection of a lower gear: After the next higher gear is engaged in the load-free power branch following the above-described routine, the transmission actuator is positioned in the neutral position without again disengaging the engaged gear. Thereafter, a positioning in the selection direction occurs in a shift passageway of a gear of a gear ratio, which is preferably smaller than that of the current drive gear and that of the gear engaged in the load-free power branch. For example, it is particularly advantageous for the gear that is calculated by the controller logic, upon a kick-down by the driver, as a target gear for maximal performance, whereby that gear can be changed during operation in that transmission position, whereupon the position of the selection actuator can also be changed. In manual operation of the vehicle, in which the driver actively selects the next drive gear step, the selected shift passageway can be that of the gear that has the next smaller gear ratio relative to the current drive gear. In a further variant for rapid acceleration of the vehicle, for example for an actuation of the accelerator pedal above a set threshold, the shift passageway can be selected with the gear into which the vehicle would shift if the vehicle were to continue to be constantly operated at the current speed, for example, a gear with higher gear ratio (overdrive) for economical operation of the vehicle. It should be understood that the shift movement is tracked corresponding to the current driving situation, and thereby the current gear alternative to the gear engaged on the load-free power branch can always be kept available using a simple shift/disengage motion.

Transmissions according to the concept of the invention can also be designed according to other aspects in which it need not be considered that the gears, which are arranged adjacent with reference to their reduction in known arrangements, for example, gears 1 and 2 in one shift passageway can be arranged to be adjacent to gears 3 and 4 in the adjacent shift passageway because the new gear to be engaged can be engaged by means of the primary actuation element and the engaged gear can be disengaged using a secondary actuation element without additional selection processes. To accelerate the shift times, the new gear to be engaged can already be pre-selected as long as the engaged gear is still engaged. The shift movement can already be initiated, while the engaged gear has not yet been disengaged, so that the transmission shift actuator can undergo a startup time before the shift process and need not be started from standstill, since, as is well known, starting up from a standstill consumes a great deal of time and delays the shift process.

It can also be advantageous for obtaining especially rapid shift processes to pre-select the likely following gear with a single branch transmission having a transmission input shaft and a transmission output shaft. The following pre-selection criteria can be advantageous as a function of the driving situation or the position of the selector lever of the transmission without a shift command to another gear having already taken place:

The selector lever is in the drive (D) position, or in manual operation mode (M; the individual gears are actuated by the driver, for example by means of a Tiptronic control), a forward gear is engaged. As long as the vehicle travels in this driving mode with a speed above a threshold to be established for each engaged gear, the accelerator position or longitudinal acceleration of the vehicle is evaluated to pre-select the next higher or next lower gear of the engaged gear. When the vehicle is accelerating, the next higher gear is pre-selected, when the vehicle slows down it is the next lower gear. In order to avoid unnecessary adjustment movements, a hysteresis band can be provided in the pre-selection routine. In the highest gear, the next lower is pre-selected. In gear 1, gear 2 can be pre-selected beginning with a speed threshold to be specified, below that the neutral position of the transmission will be pre-selected.

Gear 1 is pre-selected in the neutral position (N) of the selector lever. An arrangement of gear 1 and the reverse gear in one shift passageway can be advantageous.

In the reverse position (R) of the selector lever, gear 1 or, alternatively, the neutral position is selected.

If an intention to shift has already been established by the control logic of the transmission, an accelerated gear change can be achieved through the following measures, since after recognizing the intent to shift, as a rule some time-consuming processes, such as, for example, a reduction of the motor and clutch torque, take place, whereby in a transmission in accordance with the present invention that time can be utilized for pre-selecting the new gear to be engaged without risking stress upon the transmission actuator.

After the control logic has established the new gear to be engaged, the associated pre-selection position is determined and selected. With all pre-selection movements, the primary actuation element is first moved in the direction of the neutral position, and indeed at least so far that the primary actuation element can separate from the shift passageway of the engaged gear. Subsequently, or in a combined movement with the shift movement, the shift passageway of the new gear to be engaged is selected. If the correct gear is already pre-selected, shifting takes place through the control logic following the shift release. The amount of play movement of the primary actuation element in the shift jaws of the shift passageways is dependent upon its disengagement, and can be stored in the control logic for the purpose of an optimized shift movement. For that purpose, fixed values can be stored in the program code or correspondingly adjustable values can be stored in a memory, for example an EEPROM. The adjustable values can be determined when the apparatus is put into operation by selecting the limit positions, and can be adapted throughout the lifetime of the motor vehicle to changing conditions such as wear and tear or part replacement, whereby if need be wear and tear progression values and limits can also be filed and processed. An adaptation to shift jaws with different dimensions for the shift passageways of the different gears can likewise be advantageous.

Since in the final actuation mechanism in accordance with the present invention no correlation exists between the position of the primary actuation element or elements and the engaged gear, it can become necessary to set a so-called active neutral position in which all gears are disengaged with certainty, especially if the transmission control, for example the transmission control unit, no longer has any reliable information available, for example when the device is being returned to service following a repair, or for making the data plausible during the operation of the motor vehicle when starting, parking, or during travel. For that purpose, the at least one primary actuation element is moved into a position in which it does not engage any new gear during rotation of the selector shaft. Should a so-called free shift passageway of that type not be present in the H-shift pattern utilized, the free length of the selection function can be lengthened and an additional passageway can be created. In that passageway, one or more engaged gears can be disengaged by means of the secondary actuation elements.

Should a change in shift geometry not exist, the gear can also be disengaged with the primary actuation element by discovering the engaged gear. For that purpose, the primary actuation element must be brought into the shift passageway of the engaged gear and a disengagement movement must be carried out without engaging a new gear. For that purpose, the disengagement positions can be learned when placing the vehicle into service. Thereby, the synchronization point of the opposite gear can be assumed as the starting point for determining the disengagement position. That synchronization point is then delivered for disengaging the opposite gear. Recognition of the synchronization points can take place by learning, that is calibration, in that the corresponding position is established in relation to a reference point and is monitored by sensors, for example, incremental path sensors. The absolute determination of the synchronization points can be a further possibility, in that actuator values, such as, for example, actuator current, are monitored, and an evaluation of these, for example an increase of the actuator current on the synchronization point, is evaluated, and in that way the position of the synchronization points is determined.

BRIEF DESCRIPTION OF THE DRAWINGS

Embodiments are described below with reference to the drawing figures, which shown the following schematically and by way of example.

DESCRIPTION OF THE PREFERRED EMBODIMENTS

Figure 1A:
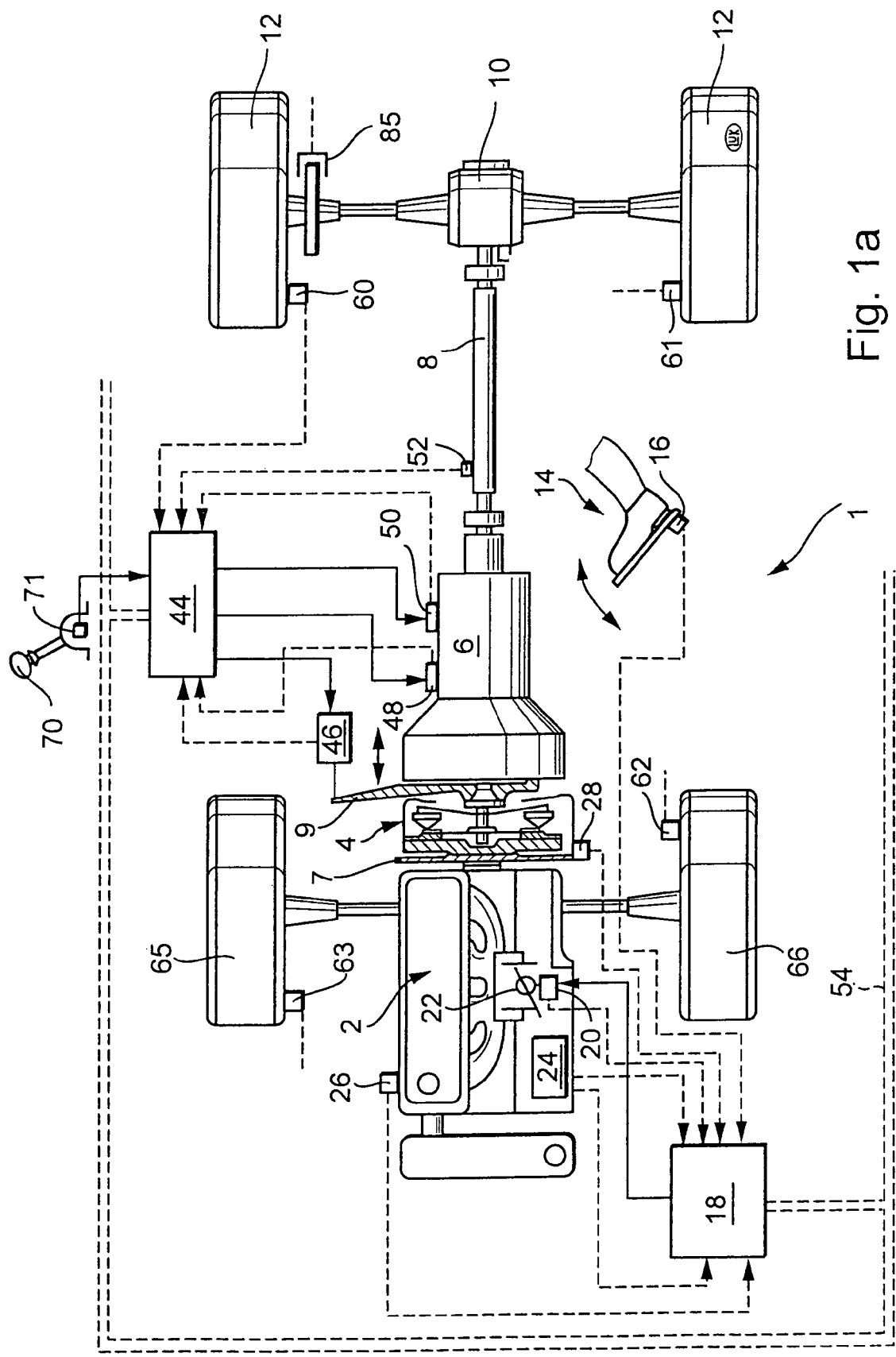
FIG. 1*a* shows a vehicle with an automatically actuatable clutch and transmission.

FIG. 1a shows schematically and by way of example a motor vehicle 1 in which the invention can be utilized especially advantageously. The clutch 4 is presently arranged in the power flow path between drive motor 2 and transmission device 6. Appropriately a divided inertial mass 7 is arranged between drive motor 2 and the clutch 4, the component masses of which are rotatable relative to each other and are in line with a spring damper arrangement, whereby the vibration characteristics of the drive train are substantially improved. Preferably, the invention is combined with a damping apparatus for absorbing or offsetting rotary impulses, or equipment for compensating for rotary impulses, or rotary impulse-diminishing apparatus, or apparatus for damping vibrations, such as are particularly described in published German patent applications DE OS 34 18 671, DE OS 34 11 092, DE OS 34 11 239, DE OS 36 30 398, DE OS 36 28 774 and DE OS 37 21 712 of the assignee, the disclosures of which are incorporated herein by reference.

The motor vehicle 1 is powered by a drive motor 2, which is presently represented as an internal combustion engine, such as an Otto- or a diesel-cycle engine. In another exemplary embodiment, the power can also be provided by means of a hybrid drive, by an electric motor, or by a hydraulic motor. The clutch 4 is a friction clutch in the embodiment illustrated, by means of which the drive motor 2 can be separated from the transmission 6, especially for starting up or for executing shift processes. More or less torque is transmitted by an increasing engagement or disengagement of the clutch. For that purpose, a pressure-receiving plate and a pressure-imposing plate are displaced axially in relation to each other, and more or less carry along an interposed friction disk. The clutch 4, constructed as a coupling, is advantageously self-adjusting, that is, the wear of the friction linings is compensated such that a constant low release force is ensured. Preferably, the invention is combined with a friction clutch, especially such as are described in German published patent applications DE OS 42 39 291, DE OS 42 39 289 and DE OS 43 06 505 owned by the assignee, the disclosures of which also are incorporated herein by reference.

The wheels 12 of the motor vehicle 1 are driven by means of a shaft 8 through a differential 10. Driven wheels 12 have associated rotational speed sensors 60, 61, whereby if need be only one rotational speed sensor 60 or 61 can be provided, which in any given case generate a signal corresponding to the rotational speed of the wheels 12. Additionally, or alternatively, a sensor 52 is provided at another suitable place in the power train, for example, on the shaft 8, for ascertaining the transmission output rotational speed. The transmission input rotational speed can be ascertained by means of a further sensor or also, as in the present embodiment, can be determined on the basis of the drive motor rotational speed. In that way, for example, the transmission ratio condition set in the transmission can be established.

Actuation of the friction clutch 4, which can advantageously be constructed to operate by compression, but which also in another embodiment can appropriately be constructed to operate by tension, takes place in the present invention using an actuation apparatus 46, such as a clutch actuator. For actuation of the transmission 6, an actuation apparatus including two actuators 48 and 50 is provided, whereby one of the actuators carries out a selection actuation and the other a shift actuation. The clutch actuator 46 is constructed as an electrohydraulic system, whereby an engaging or disengaging movement is generated using an electrical drive, such as a direct-current electric motor, and is transmitted over a hydraulic line to the disengagement system. The transmission actuators 48, 50 are designed as electrical drives, for example as direct current electric motors, which are connected with the movable members in transmission 6 through a kinematic system, which members are operated for establishing the transmission ratio conditions. In another embodiment, particularly when high operational forces are required, it can also be very appropriate to provide a hydraulic system for operation. It should be understood that even purely electromechanically-operated actuators can be provided for operation of the clutch(es). German patent application DE 100 33 649 shows not final, but possible embodiments thereof.

The control of clutch 4 and transmission 6 takes place through a control unit 44, which appropriately forms a structural unit with the clutch actuator 46, whereby it can also be advantageous in another exemplary embodiment to install them at another location in the motor vehicle. The operation of clutch 4 and transmission 6 can take place automatically in an automatic operating mode through the control unit 44, or it can take place in a manual operating mode through driver input using a driver input device 70, such as a shift or a selector lever, whereby the input is detected by means of sensor 71. In the automatic mode of operation, transmission ratio step changes are carried out by a corresponding control of actuators 46, 48, and 50 in accordance with characteristic curves or characteristic fields, which are stored in a memory associated with the control unit 44. A plurality of driving programs established by at least one characteristic curve exist from which the driver can select, such as a sporty driving program, in which the drive motor 2 is operated for optimum power, an economy program in which the drive motor 2 is operated at optimum fuel consumption, or a winter program in which the motor vehicle 1 is operated for optimum driving safety. Furthermore, the described characteristic curves are adaptive, for example to accommodate driver behavior and/or other boundary conditions, such as road friction, vehicular or track inclination, outside temperature, etc.

A control unit 18 controls the drive motor 2 by influencing mixture feed or composition, whereby a throttle valve 22 is shown illustratively in the figure, the opening angle of which is detected by an angle transducer 20, the signal from which is available to the control unit 18. In other embodiments of the drive motor control, the control unit 18, in the event that it is associated with an internal combustion engine, makes a corresponding signal available on the basis of which the mixture composition and/or the volume supplied can be determined.

Appropriately, the signal from an existing air-fuel ratio probe is also utilized. Furthermore, in the present embodiment there are available to control unit 18 a signal from the driver-operated accelerator pedal 14, the position of which is detected by a sensor 16, an engine rotational speed signal produced by an rpm sensor 28 that is associated with the engine drive shaft, a signal from an intake manifold pressure sensor 26, as well as a signal from a coolant temperature sensor 24.

The control units 18 and 44 can also be constructed in structurally and/or functionally separated sub-regions, and then they are appropriately connected with each other using, for example, a CAN-Bus 54 or another electrical connection for data exchange. Nonetheless, it can also be advantageous to combine the control units, especially since a correlation of functions is not always clearly possible, and cooperation is necessary. In particular, the control unit 44 can control the drive motor 2 with respect to rotational speed and/or torque during certain phases of the transmission ratio step changes.

The clutch actuator 46 as well as the transmission actuators 48 and 50 generate signals, on the basis of which an actuator position can at least be derived and which are available to the control unit 44. The position determination takes place within the actuator, whereby an incremental value transducer is utilized, which determines the actuator position in relation to a reference point. In another embodiment, it can nonetheless also be useful to arrange the transducer outside the actuator, and/or to provide an absolute position determination, for example using a potentiometer. A determination of the actuator position is especially of great significance with respect to the clutch actuator in that the engagement point of the clutch 4 can thereby be associated with a certain engagement path and consequently to an actuator position. Advantageously, the engagement point of the clutch 4 is repeatedly determined while placing the vehicle into operation and during operation, especially as a function of parameters such as clutch wear, clutch temperature, etc. A determination of transmission actuator position is important in respect to the determination of the engaged transmission ratio condition.

Furthermore, signals from rotational speed sensors 62 and 63 of the non-driven wheels 65 and 66 are made available to the control unit 44. For determination of vehicle speed, it can be appropriate to use the mean value of the rotational speed sensors 62 and 63 or 60 and 61 in order to compensate for rotational speed differences, such as when traveling in a curve. Using the rotational speed signals, the motor vehicle speed can be determined, and, in addition, slip recognition can also be performed. In FIG. 1, output connections of the control unit are represented by solid lines, and input connections are represented by dashed lines. The connections of sensors 61, 62 and 63 to the control unit is only suggested.

Figure 1B:
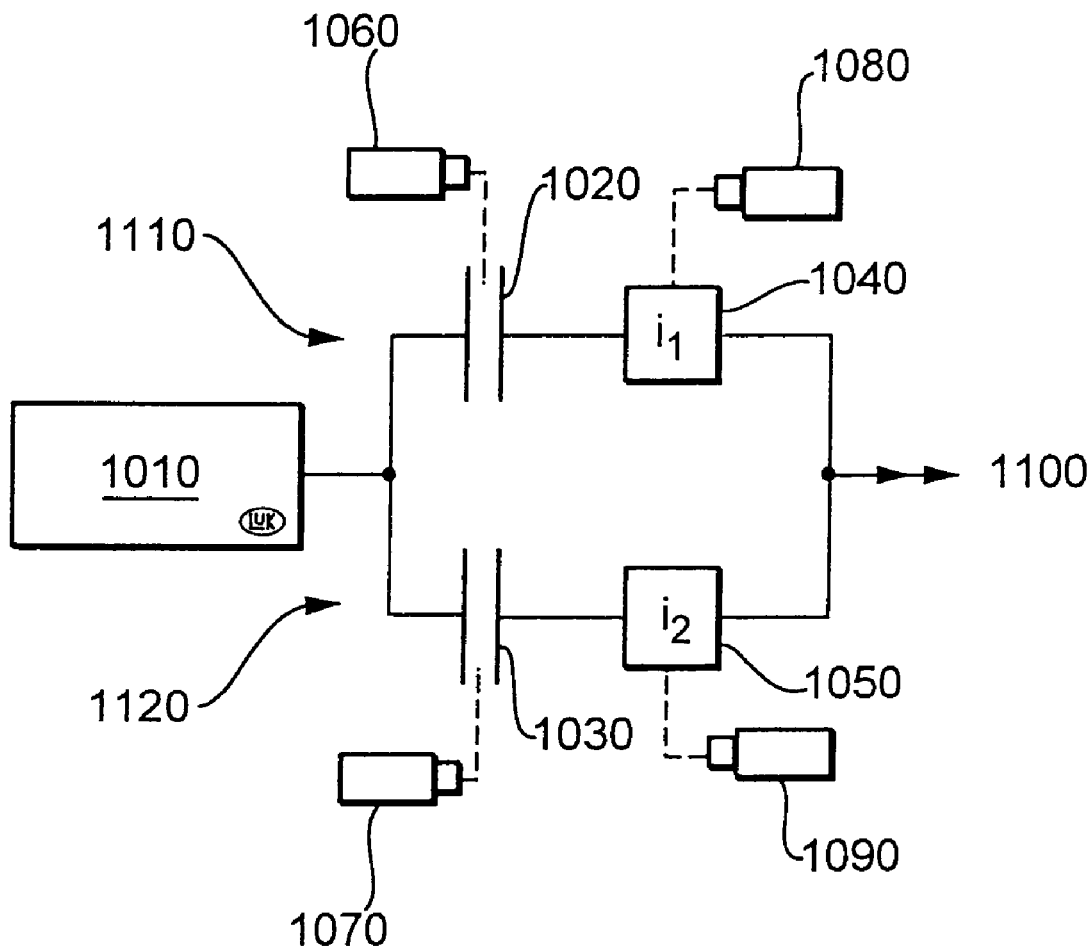
FIG. 1*b* shows a motor vehicle with a branched power train.

The present invention can also be utilized especially advantageously even with a vehicle with a drive train such as is illustrated schematically and by way of example in FIG. 1b. With a motor vehicle of that type it is possible to change transmission ratio steps free of tractive force interruption. Two branches 1110 and 1120 through which torque flow can take place are formed between the drive motor 1010 and output 1100. Each of the branches is associated with a clutch 1020 or 1030 between drive motor 1010 and can be incorporated into the torque flow by means of it. A preferred embodiment is illustrated in which the clutches 1020 and 1030 are arranged between drive motor 1010 and transmission ratio steps 1040 or 1050. In another embodiment, it can nonetheless also be appropriate to arrange one or both clutches 1020 and/or 1030 between the transmission ratio steps 1040, 1050 and the output 1100.

A continuous change of torque flow from one branch 1110, 1120 to the other branch 1120, 1110 can be attained through an actuation of the clutches 1020 or 1030 in an overlapping shift process. Two groups 1040 and 1050 of transmission ratio steps are present, which are included in one of branches 1110 or 1120 in any given case, whereby it should be possible to execute a tractive-force-interruption-free change between transmission ratio steps that belong to different groups. Preferably, transmission ratio steps that are successive with regard to their transmission ratios belong to different groups. For example, gears 1, 3, and 5 form group 1040 and gears 2, 4, and if need be 6, form group 1050. Reverse gear (R) is appropriately associated with group 1050. In other embodiments, it can also be advantageous if the division of the transmission ratio steps into groups takes place in a different manner, or if certain transmission ratio steps are usable in group 1040 as well as in group 1050, or are present in both groups.

Clutches 1030 and 1020, as well as transmission ratio steps of groups 1040 and 1050, as in the example illustrated and described in FIG. 1a, can also be automatically actuated. For that purpose, clutch actuators 1060 and 1070 are shown for operating clutches 1020 and 1030. It can also be very appropriate in another embodiment to use only one clutch actuator for operating both clutches. Furthermore, actuation devices (actuators) 1080 and 1090 are shown for actuating transmission ratio steps of groups 1040 and 1050. Nonetheless, an especially advantageous embodiment has only one actuation device for actuation of transmission ratio steps of both groups 1040 and 1050. An actuation drive therefor includes a selection drive and a shift drive. For details of clutch and transmission actuation, as well as control, reference should be made to FIG. 1a with its associated description.

Furthermore, the present invention can be utilized in connection with a motor vehicle whose drive train includes a main branch and a parallel auxiliary branch, through which the drive torque is transmitted during a shift process in the main branch. Such transmissions have become known in various embodiments as interruption-free-shift transmissions.

Figure 2:
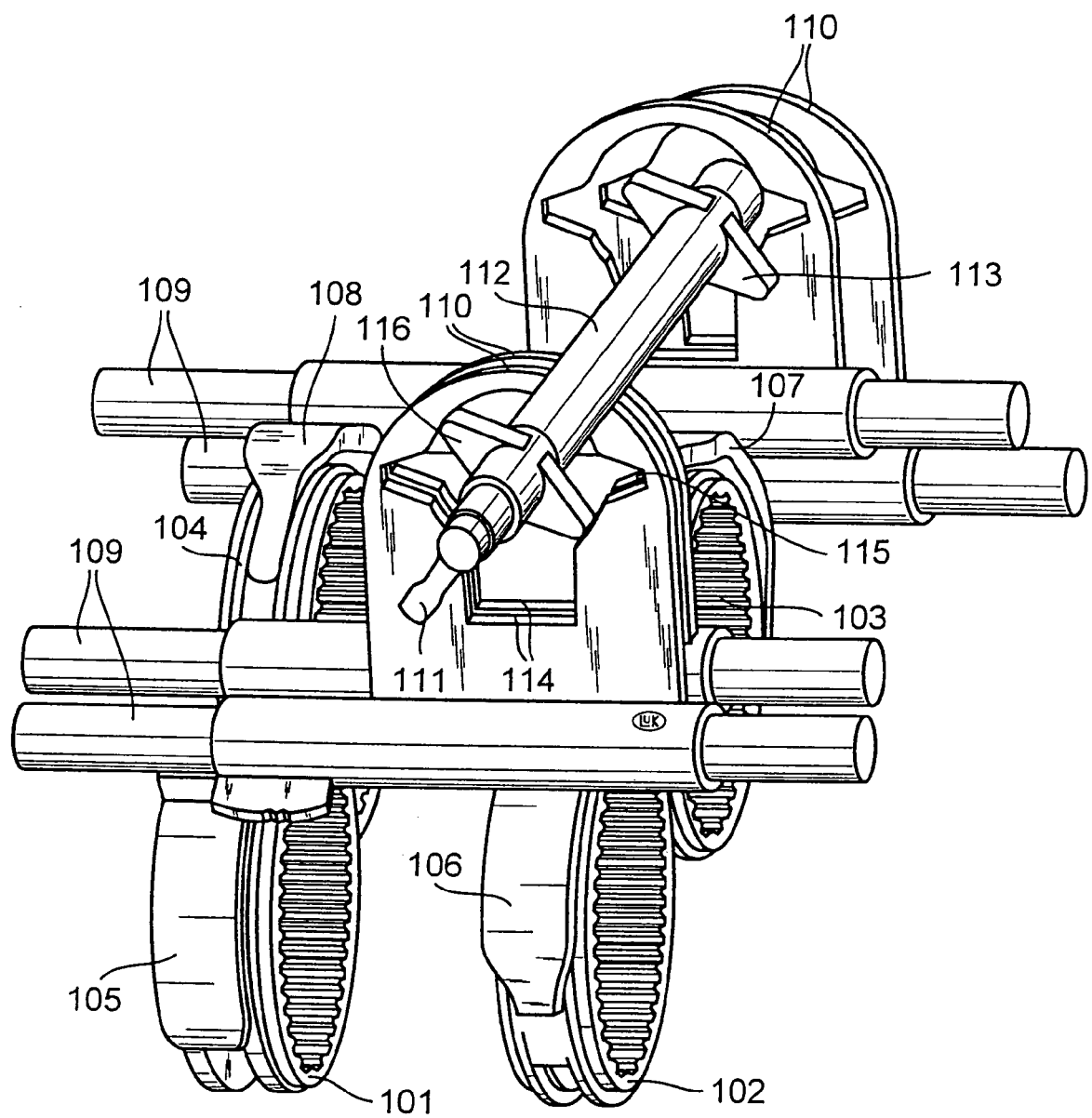
FIG. 2 shows final output mechanisms with a final actuation mechanism.

FIG. 2 shows final output mechanisms with final actuating mechanisms in accordance with a particularly preferred example in accordance with the invention in an application of a vehicle as the one shown and described in FIG. 1b. The final output mechanisms are formed by a coupling sleeve 101, 102, 103, 104 and a shift fork 105, 106, 107, 108, respectively, that is connected with it. A group of transmission ratio steps is actuated through the final output elements 101 and 104, such as coupling sleeves, the other group of transmission ratio steps is actuated through the final output elements 102 and 103. The final actuating mechanism is equipped with main and secondary actuation elements for the purpose of its connection with the final output mechanisms of both groups. A first main actuating element 111 and an additional main actuating element, which in this view is not visible, are suitable for engaging transmission ratio steps; secondary actuation elements 116, 113 ensure that all other transmission ratio steps of the same group, respectively, are disengaged. The shift forks 105, 106, 107, 108 are arranged on shaft 109 in an axially displaceable manner, their shift fork mouths are designed so as to connect with a main actuating element, respectively, such as shift fingers 111, or a secondary actuating element, such as double cams 113, 116. For this, first partial areas 114 are provided for connection with a shift finger 111 and second partial areas 114 for connection with a double cam 113. In order to engage a transmission ratio step, for example, the shift finger 111 interacts with the end area 110 of the appropriate shift fork 105 or 106 by displacing the control shaft 112 in axial direction. At the same time, the double cam 113 interacts with the appropriate shift fork 107 or 108, which belongs to the same group of transmission ratio steps. A rotation of the control shaft 112 swivels the shift finger 111, thus displacing the shift fork 105 or 106 on the shaft 109 and therefore also the appropriate coupling sleeve 101 or 102 and engaging the appropriate transmission ratio step. Simultaneously, the rotation of the double cam 113 causes the affected transmission ratio step to be disengaged, if one was engaged.

If it is a transmission with a clutch and a drive branch, as shown in FIG. 1a, secondary actuation elements interact with all other final output mechanisms, respectively, when a main actuating element interacts with a first final output mechanism. In the case of a double clutch transmission with two parallel transmission branches, secondary actuating mechanisms interact with all other final output mechanisms of a branch, respectively, when a main actuating element interacts with a first final output mechanism of that branch, Thus, only one transmission ratio step can be engaged in one branch at any time, however it is possible to engage one transmission ratio step in each branch simultaneously.

Figure 3A:
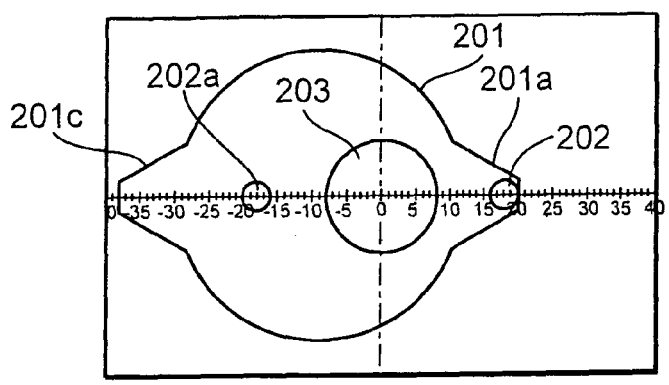
FIG. 3*a* shows a mode of operation of a secondary actuation element.
Figure 3B:
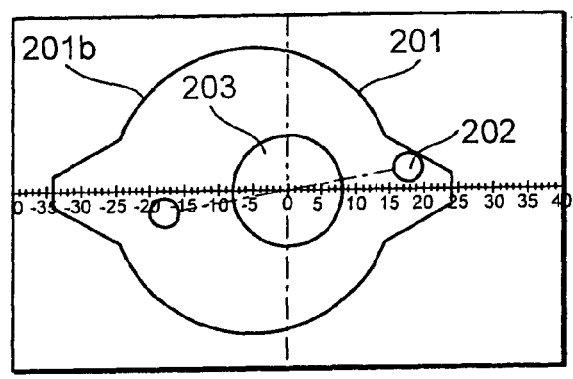
FIG. 3*b* shows a mode of operation of a secondary actuation element.
Figure 3C:
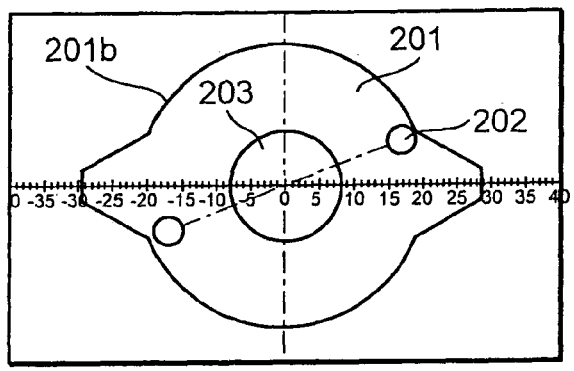
FIG. 3*c* shows a mode of operation of a secondary actuation element.
Figure 3D:
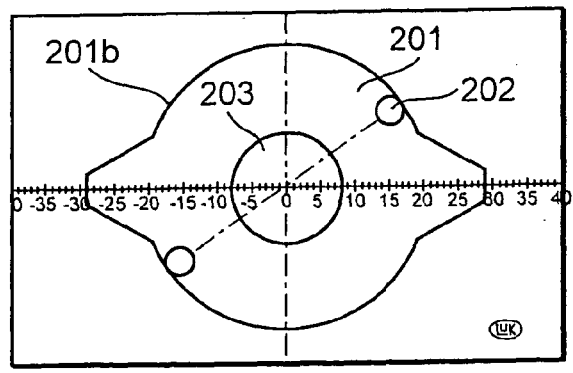
FIG. 3*d* shows a mode of operation of a secondary actuation element.

FIGS. 3a, 3b, 3c, 3d show the function of a secondary actuating element in more detail. Starting in FIG. 3a, in which the transmission ratio step associated with the shift fork 201 is engaged and the secondary actuating element is interacting with the shift fork 201 through axial displacement of the control shaft, the control shaft 203 is rotated so that the end area 202 of the double cam—see 113 in FIG. 2—is pressed against the slope 201a and thus a force is generated in the disengagement direction that is larger than or equal to the required disengagement force, thus causing a disengagement motion, as shown in FIGS. 3b and 3c. In FIG. 3d, the transmission ratio step is completely disengaged, and the control shaft 203 can be rotated freely without power being transferred to the shift fork 201 in engagement or disengagement direction, wherein the double cam rotates within the circle limited by 201b. The state shown in FIG. 3d also predominates when no transmission ratio step of the affected shift fork 201 has been engaged from the beginning. The secondary actuating element can be rotated freely within the circle limited by 201b.

Similar to the above described disengagement process disengagement occurs when the other transmission ratio step that has been actuated through the same shift fork is engaged. In FIG. 3a, the shift fork 201 would then be displaced to the right at the beginning in relation to the control shaft 203, and the effect would occur between the cam 202a and the slope 201c. Disengagement takes place for both transmission ratio steps associated with the shift fork 201 and for both rotational directions of the control shaft 203.

Figure 4:
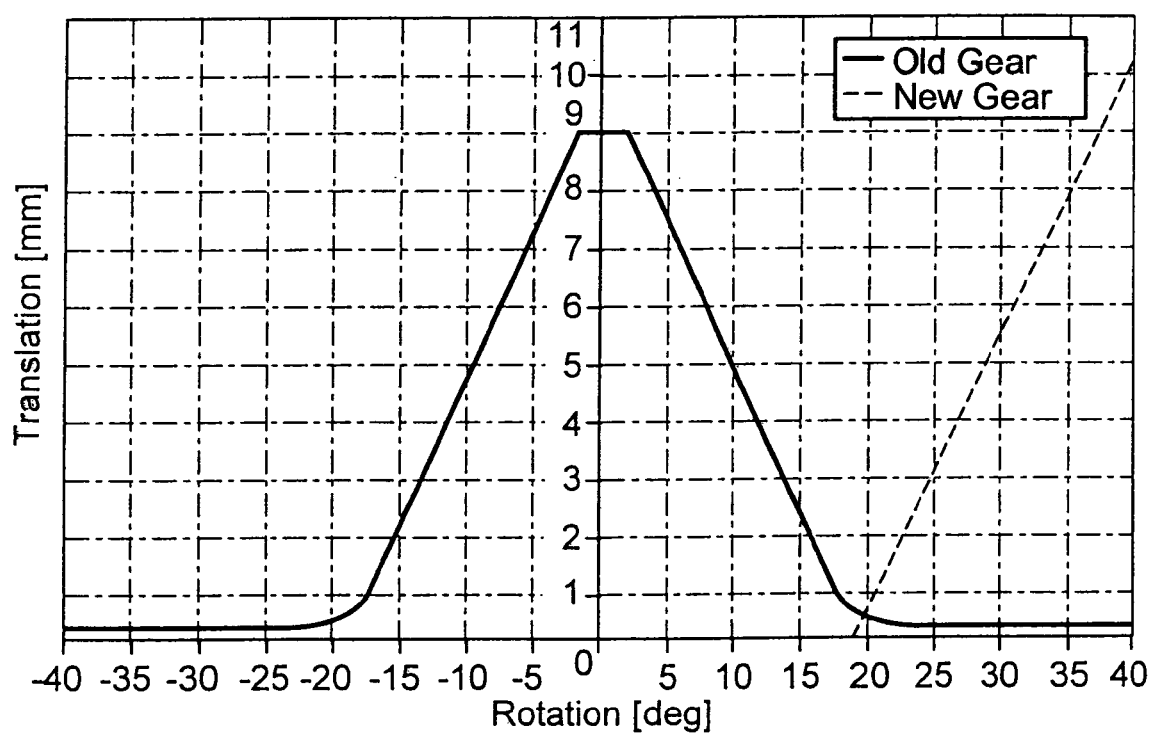
FIG. 4 is a graph showing coupling sleeve movement as a function of selector shaft angle of rotation.

Engagement or disengagement of an old or new transmission ratio step upon rotation of the control shaft is shown in FIG. 4. First, the old transmission ratio step is disengaged through the double cam, see the solid line; upon further rotation, the new transmission ratio step is engaged, see the dashed line. This clarifies the closeness with regard to time at which the disengagement and engagement of the transmission ratio steps occur, and which may even overlap slightly, which is enabled by allowing the main actuating element and the secondary actuation elements to mesh simultaneously with the respective shift forks and by swiveling both actuation elements upon rotation of the control shaft. The delay between the disengagement motion of the coupling sleeve of the old transmission ratio step and the engagement motion of the new transmission ratio step is largely determined by the play of the main actuating element in the shift fork mouth, the design of the double cams, and the relative angular arrangement of the main and secondary actuation elements on the control shaft—see also FIG. 5a. Particularly preferred, due to its symmetry, is an arrangement where the axis of the double cam from tip 403a to tip 403b rests vertically on the axis of the control finger 402. It may however also prove useful if those axes are not perpendicular to each other, particularly when a shift fork must be actuated that shifts only one transmission ratio step.

Figure 5A:
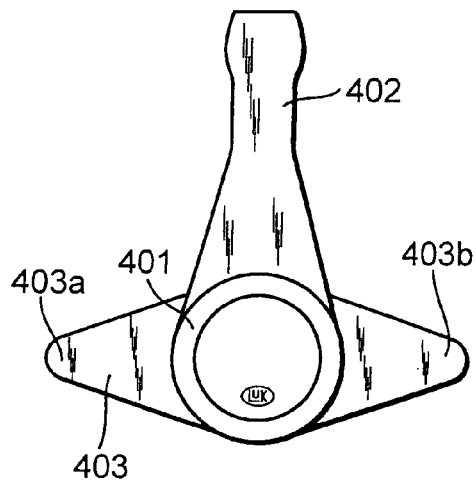
FIG. 5*a* shows an arrangement of a primary actuation element and a secondary actuation element on a selector shaft.
Figure 5B:
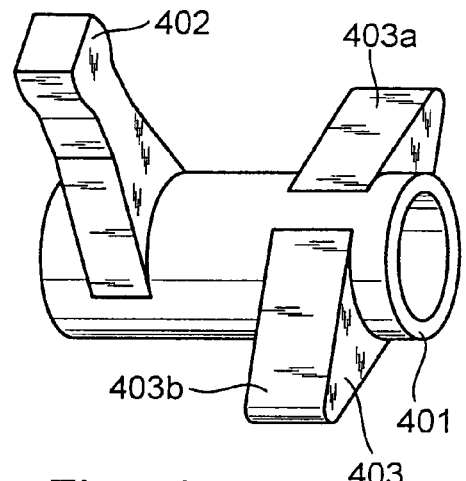
FIG. 5*b* shows an arrangement of a primary actuation element and a secondary actuation element on a selector shaft.
Figure 6A:
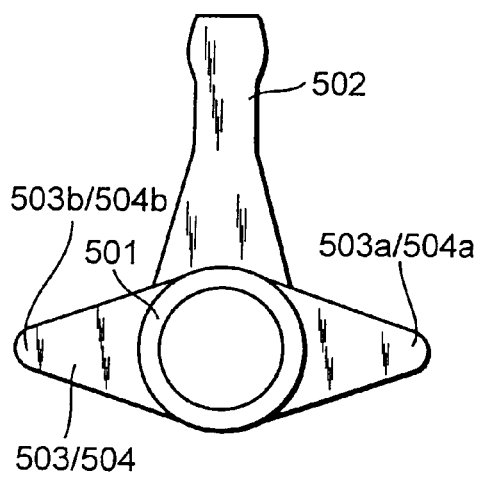
FIG. 6*a* shows an arrangement of a primary actuation element and two especially wide secondary actuation elements for actuation of two final output mechanisms at the same time.
Figure 6B:
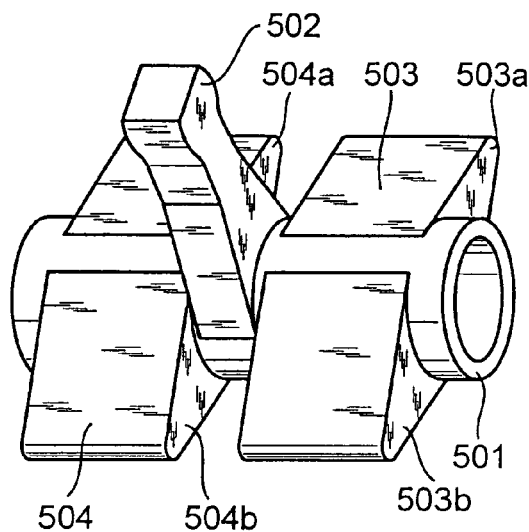
FIG. 6*b* shows an arrangement of a primary actuation element and two especially wide secondary actuation elements for actuation of two final output mechanisms at the same time.

FIGS. 5a and 5b show an arrangement of a main actuating element 402 and a secondary element 403 on a control shaft 401. Shift fingers and appropriate double cams are located axially on the control shaft axis at a spacing so that they interact with shift forks that are associated with the same transmission branch when the control shaft is displaced appropriately in an axial direction so that during a subsequent rotation of the control shaft the affected transmission ratio steps can be actuated simultaneously. From a radial point of view, the axes of the shift fingers 402 and the double cam 403 with the end areas 403a and 403b have a normal position relative to each other in the illustrated preferred example. Another arrangement is shown in FIGS. 6a and 6b. Two double cams 503 and 504 with their end areas 503a, 503b, 504a and 504b are arranged next to a shift finger 502 on the control shaft 501. In this example as well, the axes of the shift finger 502 and the double cam 503, 504 have normal positions relative to each other. The double cams 503, 504 have a particularly wide design so that they can interact with two shift forks, respectively. This way, each of the double cams 503, 504 can actuate two shift forks for disengaging the appropriate transmission ratio steps. In another example, it may also prove very beneficial to combine such wide double cams with simple double cams.

It may also be useful to further widen one double cam in order to actuate more than two shift forks simultaneously. The usage of particularly wide secondary actuation elements should always be preferred when final output mechanisms are supposed to be actuated whose shift forks are located next to each other.

Figure 7:
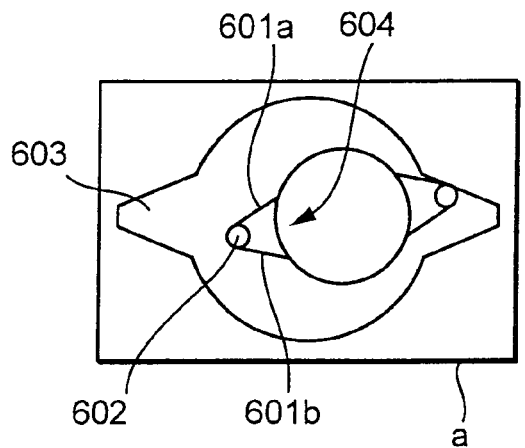
FIG. 7 shows arrangements of secondary actuation elements.
Figure 7:
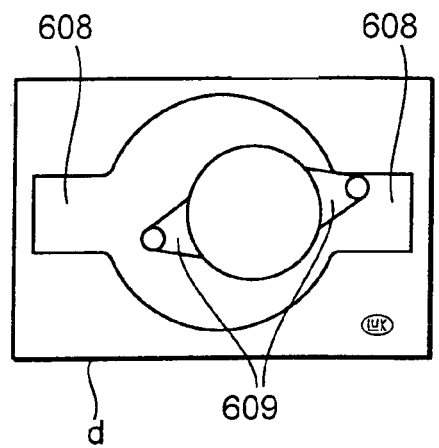
Figure 7:
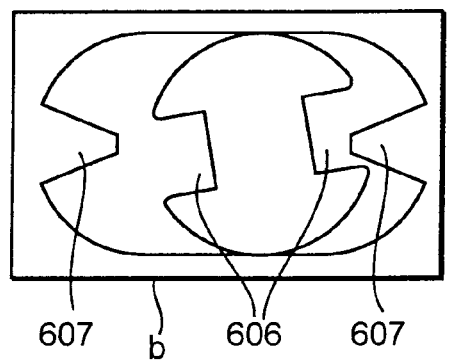
Figure 7:
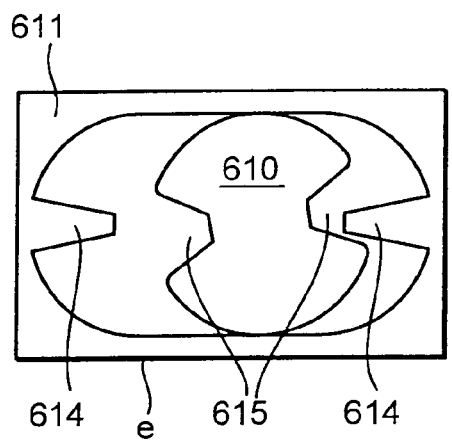
Figure 7:
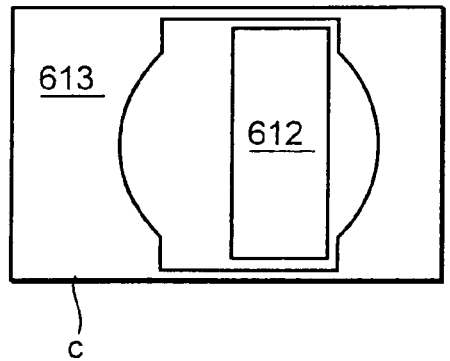

FIG. 7 shows examples of beneficial versions of secondary actuation elements. The double cam described so far is marked 'a.' Both the cam end areas and the corresponding recesses 603 have a wedge-shaped design. As an example, one cam 604 will be described. Illustrated are two sloped functional areas 601a and 601b, the cam end area 602 is rounded. In a preferred example, the areas 601a and 601b enclose an angle of 40° to 45°, with the angle being selected accordingly larger if the force that is required to disengage the transmission ratio step that is to be actuated is larger. The shape of the cam largely determines the course of the disengagement force that is generated for a disengagement motion upon rotation of the control shaft. In another example, the shape of the cam is therefore adjusted to the necessary force line that occurs during disengagement. The recess 603 that corresponds to the cam encloses a slightly larger angle with the areas that limit it than the angle of the cam. The design of the recess depends on the shape of the cam since interaction between cam and recess is decisive.

Combinations with a wedge-shaped and a rectangular-shaped corresponding part are shown in variations b and d. In variation b, the rotating secondary actuating element is equipped with rectangular recesses 606, which interact with wedge-shaped cams 607 of the displaceable shift fork; in variation d, the displaceable shift fork has rectangular recesses 608, which interact with wedge-shaped cams 609 of the rotating secondary actuating element. Variation e shows, just like variation a, two wedge-shaped corresponding parts, wherein here however the rotatable secondary actuating element 610 has recesses 615 and the movable shift fork 611 has cams 614. Two rectangular corresponding parts 612, 613 are shown in variation c.

The variations shown vary the idea of a wedge shape and a rectangular shape with recess or cam on the actuating element that can be rotated with the control shaft or the displaceable final actuating mechanism.

Figure 8:
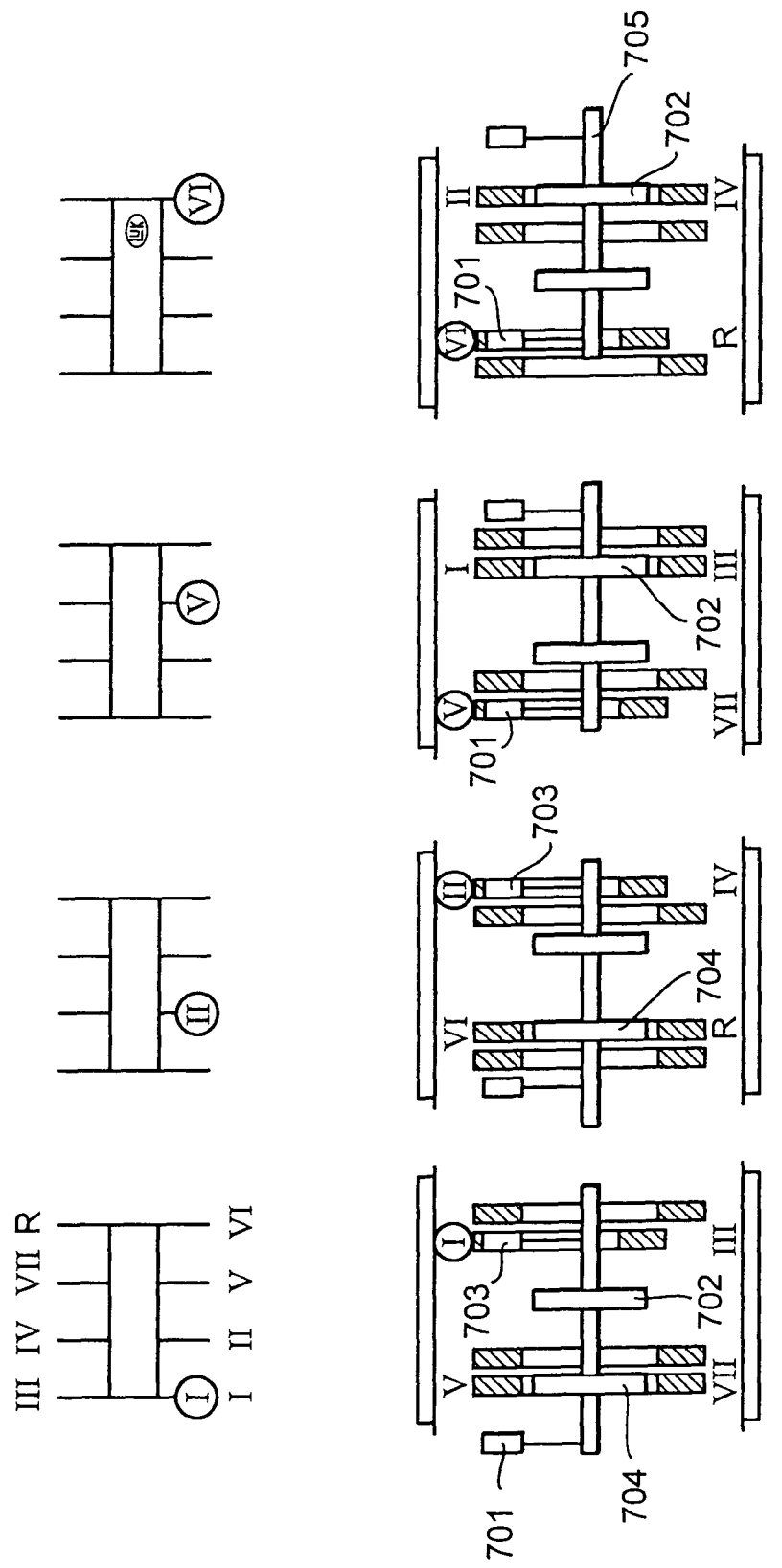
FIG. 8 shows selector shaft positions and H-shift patterns, FIGS. 9*a* and *b* show selector shaft positions and H-shift patterns with a wide secondary actuation element.

The control shaft position and H-figure are shown in FIG. 8. The example relates to a double clutch transmission where the gears 1, 3, 5, and 7 form a group that is associated with one clutch, and the gears 2, 4, 6 as well as the reverse gear R form another group that is associated with the other clutch. View a shows the engagement process of the gear 1. Since only one gear of one group can be engaged at a time, the gears 3, 5, and 6 must be disengaged when shifting into the gear 1. Gear 3 is actuated by the same shifting clutch as gear 1, i.e. it cannot be engaged at the same time anyway. Upon axial displacement of the control shaft 705 for the purpose of connecting the shift finger 703 with the shift fork associated with the gear 1, the secondary actuating element 704 interacts simultaneously with the shift fork associated with gears 5 and 7. The rotation of the control shaft 705 for the purpose of engaging the gear 1 causes the gears 5 or 7 to be disengaged. View b shows the engagement process of gear 2, where the secondary actuating element 704 disengages the gears 6 and/or R. Upon engaging gear 5 through the shift finger 701, the gears 1 and/or 3 are disengaged through the secondary actuating element 702, see view c. View d shows the engagement process of the gear 6, wherein the gears 2 and/or 4 are disengaged.

The synchronization can take place using active interlock-actuated transmissions using synchronization devices at each individual transmission ratio step. Nonetheless, a central synchronization device can be advantageous which, for example, is arranged on the highest transmission ratio step. Thus, in the embodiment of a double clutch transmission illustrated in FIG. 8, for example, a synchronization device can be arranged in the transmission branch of gear ratios 1, 3, 5, 7 on transmission ratio step 7, and a synchronization device can be arranged in the transmission branch of gear ratios 2, 4, 6, R on transmission ratio step 6. The function will be explained by way of example for a shift from gear 1 to gear 3. Here the engaged gear 1 is disengaged by means of shift finger 703. The selector shaft 705 is now displaced axially so that the shift finger 701 can be brought into engagement with the sliding sleeve of gear 7, and an actuation of the synchronization device of gear 7 can take place by rotation of the selector shaft 705, but gear 7 is not engaged. After attaining a target rotational speed, the selector shaft 705 is displaced back axially again so that the shift finger 703 engages gear 3 by means of a rotation of the selector shaft 705.

Figure 9B:
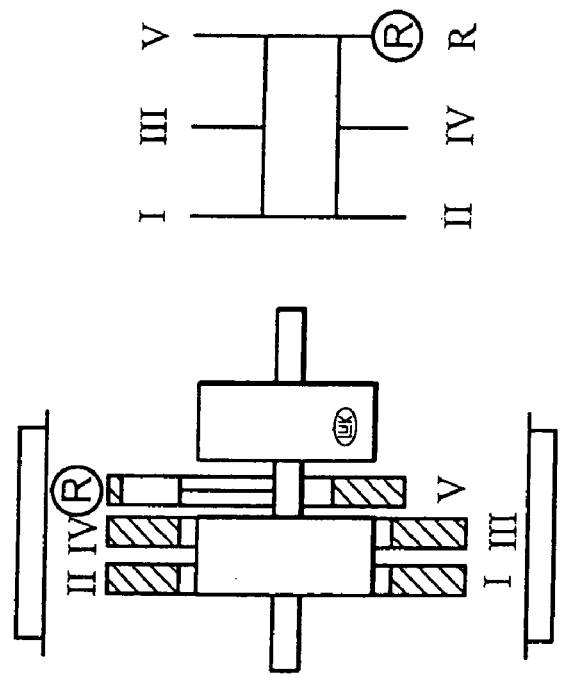
Figure 9A:
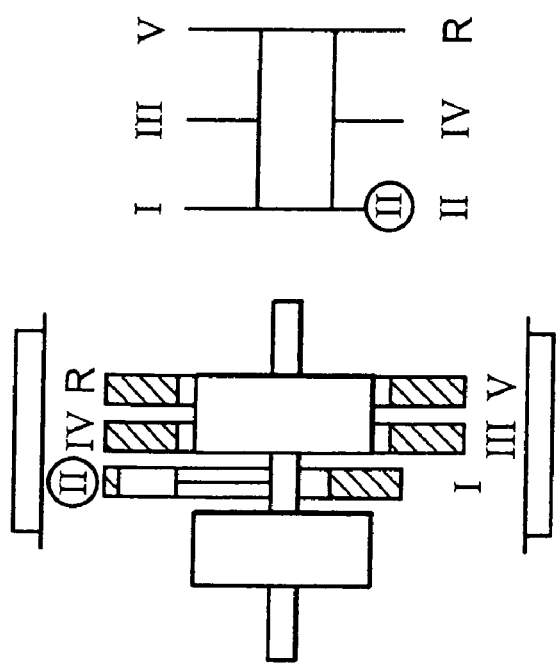

FIGS. 9a and 9b show the function of a wide cam described in FIGS. 6a and 6b. Upon engaging e.g. the gear 2—see FIG. 9a—the gears 3, 4, 5, and/or R are simultaneously disengaged; upon engaging the reverse gear—see FIG. 9b—the gears 1, 2, 3, and/or 4 are simultaneously disengaged.

Figure 10:
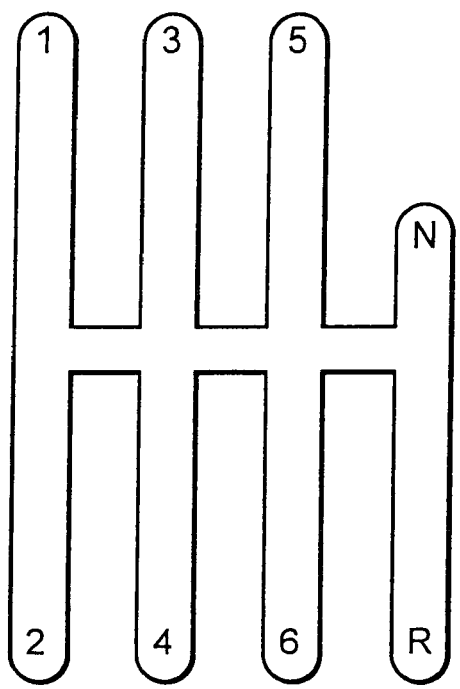
FIG. 10 shows an H-shift pattern for a transmission having a neutral position.

FIG. 10 shows the use of a neutral position N in an example of an H-shift pattern for a transmission with six transmission ratio steps 1–6 and a reverse gear R. The engagement and disengagement of the individual transmission ratio steps takes place as described relative to FIG. 9. In the illustrated embodiment, the neutral position N is shiftable in the shift passageway of the reverse gear R. Moreover, the secondary and primary actuation elements arranged on the selector shaft are so arranged that with a rotation of the selector shaft, transmission ratio steps 1–6 are disengaged using the secondary actuation element, which is correspondingly axially broadened in the direction of the axis of the selector shaft, or consists of individual shifting cams positioned in the shift passageways of the individual transmission ratio steps 1/2, 3/4, 5/6, whereby the rotation of the selector shaft can be less than with a shift between two transmission ratio steps, as only transmission ratio steps are disengaged. A possibly engaged reverse gear R is disengaged by means of the primary actuation element such as a shift finger. It should be understood that the neutral position can also be provided in other shift passageways, or it can be arranged in an additional shift passageway, as this can be advantageous in transmissions with five gear steps, for example, since here the reverse gear is mostly arranged in the shift passageway of gear stage 5 (see FIG. 9). Here an additional shift passageway is provided for the neutral position, and the transmission ratio steps 1–5, R are correspondingly disengaged by means of the secondary actuation elements. The primary actuation element, such as a shift finger, does not thereby disengage any transmission ratio step.

The neutral position can also be provided to deactivate a parking brake. Here two transmission ratio steps in the transmission are engaged following motor vehicle standstill for the purpose of activating the parking brake and are disengaged again with a shift to the neutral position.

Figure 10A:
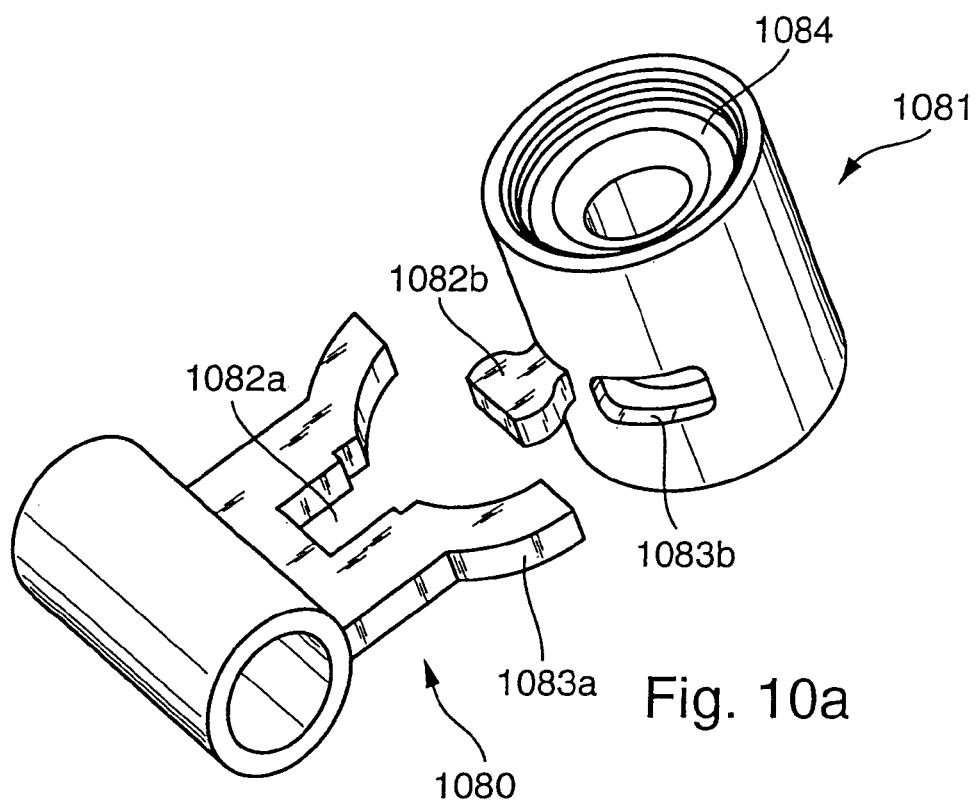
FIG. 10a shows an exemplary embodiment of the invention for use with a conventional manual shift transmission.

FIG. 10a shows an example of the invention for application on a conventional manual transmission, which at the same time is also a particularly preferred embodiment. Although only one shift fork 1080 is shown, the described transmission is equipped with several shift forks. The shift forks 1080 of such a transmission are equipped with an engagement area 1082a for the engagement of a shift finger 1082b as well as with two legs 1083a. The legs 1083a together form an arc, whose diameter at least roughly corresponds to the diameter of a bushing-shaped actuating element 1081 that is installed between the arc-shaped legs 1083a. During operation the bushing-shaped actuating element 1081 can in certain positions be rotated and can be axially displaceable by a manually actuated shift rod. Through the axial displacement of the bushing-shaped actuating element 1081 a shift finger 1082b can interact with the actuating area 1082a of the desired shift fork so that a subsequent rotation of the bushing-shaped actuating element 1081 causes a swiveling motion of the shift finger 1082b and thus a displacement of the shift fork 1080. The rotation is enabled because notches 1083b, with which the ends of legs 1083a can mesh upon a rotational motion, are provided in the sleeve of the actuating element 1081. As already described above, additional shift forks are incorporated axially in the transmission at a distance from each other with regard to the bushing-shaped actuation elements 1081. Those shift forks also have arc-shaped legs, into which the bushing-shaped actuating element 1081 is inserted. Since no notches like 1083b are axially present in the bushing-shaped actuating element 1081 at the height of those additional shift forks, those shift forks are fixed in their mean position in accordance with the neutral position. In that way, an actuating mechanism is connected particularly effectively with a locking device of the remaining shift forks in neutral position for actuation of the desired shift fork. The connection of the sleeve of the actuating element 1081 with an actuating rod (not shown) takes place, for example, through bushing-shaped elements 1084. The shift finger 1082b is advantageously connected with the sleeve through a very firm connection. Particularly suited for this are welding or gluing procedures. Alternatively, or in combination with this, the shift finger 1082b can be connected with the sleeve mechanically by a positive lock.

Figure 10B:
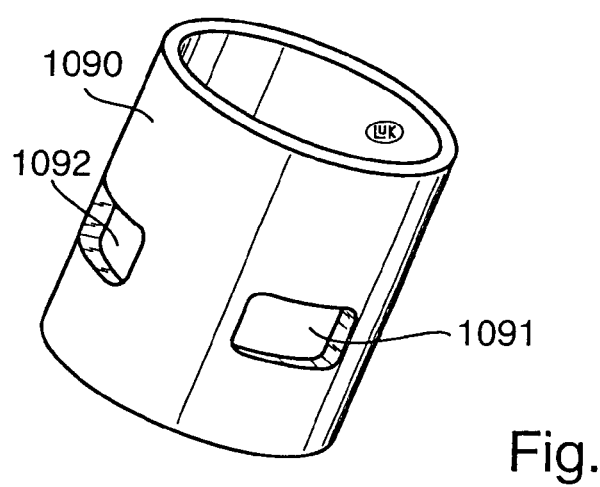
FIG. 10b shows the sleeve of the actuation element.

FIG. 10b shows the sleeve 1090 of the actuating element 1081 more closely. In a particularly preferred version, the sleeve is made from a tube section, into which recesses 1091 and 1092 are incorporated, e.g. in a machining process or also through a cutting technique such as laser cutting or flame cutting. In their basic shape, the recesses 1091 and 1092 correspond at least roughly to the cross-section of the shift fork leg 1083a; however they are slightly expanded particularly in the circumferential direction in order to enable the displacement of the shift fork 1080. It is also beneficial to manufacture the sleeve from flat sheet metal, which is then rolled and connected. The recesses 1091 and 1092 are manufactured e.g. through punching, in the case of a flat state of the sheet metal.

Figure 11A:
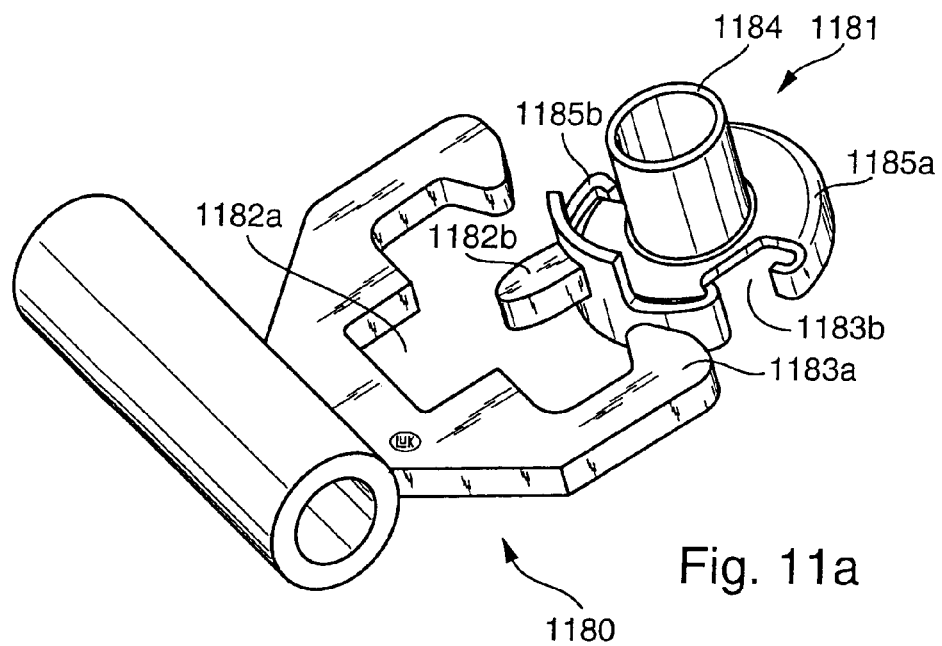
FIG. 11a shows an exemplary embodiment of the invention for use in an automated shift transmission.

FIG. 11a shows an example of the invention for application on an automated shift transmission as described further above in detail, which at the same time is a particularly preferred embodiment. The shift fork 1180 is equipped with a first functional area 1182a for the engagement of a shift finger 1182b, which is expanded so much that a large enough selection branch remains even after engagement of a transmission ratio step by displacing the shift fork 1180 in order to interact with the first functional area of an additional shift fork. When a transmission ratio step of that additional shift fork is engaged, the old transmission ratio step should be disengaged at the same time, for which second functional areas 1183a are provided on the shift fork, which interact with the appropriate recesses 1183b. Upon rotating the actuating element 1181, the shift fork is in each case shifted into its neutral position and the disengagement force is transmitted by the side areas of the recess 1183b, which is formed by an appropriate bent piece of sheet metal, to the wedge-shaped second functional area of the shift fork. The actuating element 1181 is formed, for example, by a bushing-shaped element 1184 having side elements 1185a and 1185b, preferably made from sheet metal, that are connected with it, whose end areas have such a design as to form the desired functional areas; additionally, the shift finger 1182b is connected with the side element 1185b, wherein this connection can occur like the connection of the shift finger in FIG. 10a. FIG. 11a furthermore clarifies that the shift finger 1182b—the main actuating element—and the recesses 1183b—the secondary actuation elements—are arranged axially on the axis of the actuating element 1181 at a distance from each other in such a way that the shift finger 1182b can interact with a shift fork and the recess 1183b with an additional shift fork at the same time. During a (shift) actuation, both shift forks are actuated simultaneously so that a transmission ratio step is engaged and at the same time another one is disengaged and/or it is ensured that the neutral position predominates. This figure describes only one example of a special embodiment, the entire function was already shown in previous figures so that representatively only one element with a main and a secondary actuating element is shown.

Figure 11B:
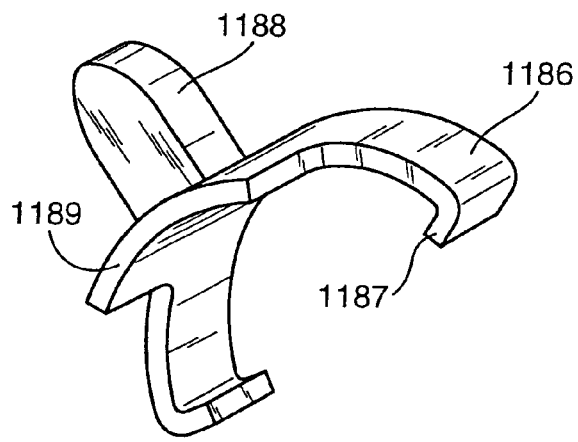
FIG. 11b shows a side element.

The side element 1185b of FIG. 11a is shown more closely in FIG. 11b. The element is manufactured from sheet metal, preferably in a punching process. The center area 1189 is widened compared to the end areas 1186, which results in special stability in the area of the shift finger 1188; additionally, the end areas 1187 are easily malleable. The bent ends 1187 form the counter-piece to the second functional area 1183b of the shift fork.

Figure 11C:
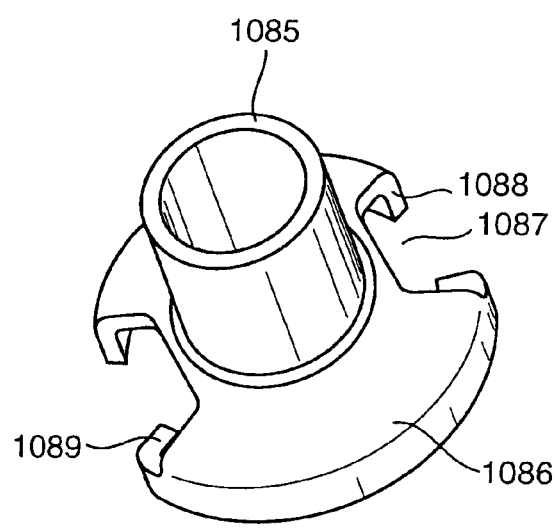
FIG. 11c shows a bushing-like element.

The bushing-shaped element 1184 of FIG. 11a is shown in more detail in FIG. 11c. The element is preferably manufactured in two pieces from a tube piece 1085 and a punched sheet metal collar 1086 that is connected with it, which is bent into the illustrated shape through a forming process. In another embodiment, the entire element is a single piece. The collar is then shaped in the illustrated manner from a tube piece in a forming process. The two side areas 1088 and 1089 of the recesses 1087 have different designs for the meshing of the second functional areas 1183a of the shift fork 1180. Only the side area 1089 relevant for the function has the bent end area.

Figure 12A:
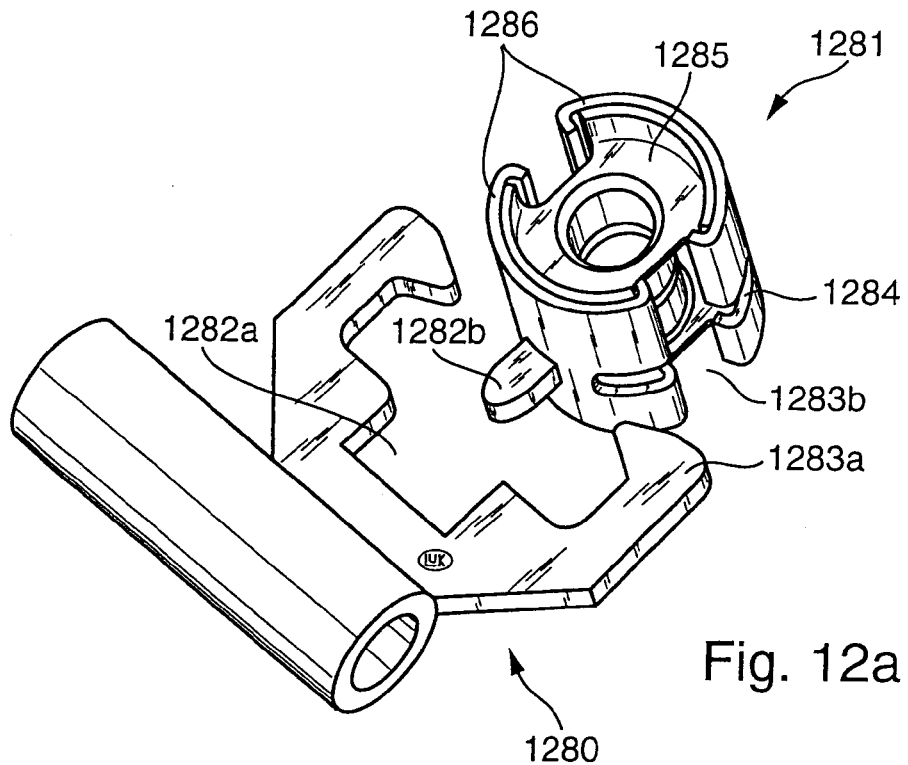
FIG. 12a shows an exemplary embodiment of the invention for use in a double-clutch transmission.

FIG. 12a shows an exemplary design of the invention for application on a double clutch transmission, which is described in detail further above, which at the same time is a particularly preferred embodiment. The bushing-shaped element 1281 consists of two interior bushings 1285, which are arranged in such a manner to each other that their collars face away from each other. They carry the two side areas 1286, of which one includes a shift finger 1282b that can interact with the first functional areas 1282. Recesses 1283b provided in the element 1281 are suited to interact with second functional areas 1283a in order to ensure the neutral position of a shift fork, as already described above. Those recesses—in the illustration shown one each of every side of the shift finger—are arranged along the axial sleeve shape of the element 1281 at a distance from the shift finger 1282b in such a manner that they and the shift finger 1282b can interact simultaneously with the desired shift forks. Recesses or grooves 1284 are provided at the same axial height of the shift finger 1282b, which provide a compartment for the second functional areas 1283a of the same shift fork during a shift movement in accordance with a rotation of the element 1281 for the purpose of actuating a shift fork so that an unimpaired shift movement is enabled.

Figure 12B:
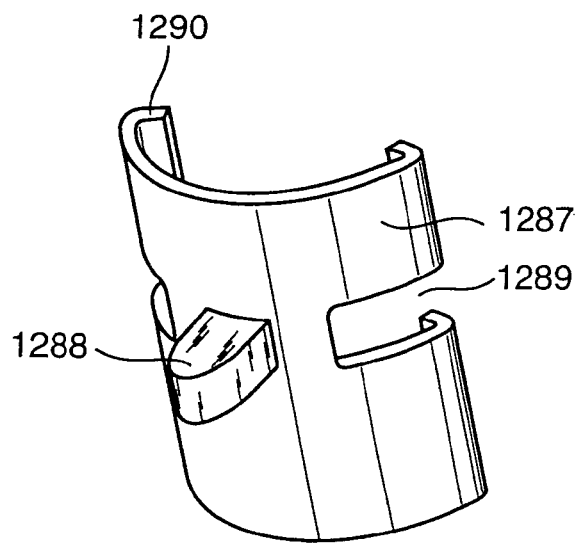
FIG. 12b shows a side element.
Figure 13:
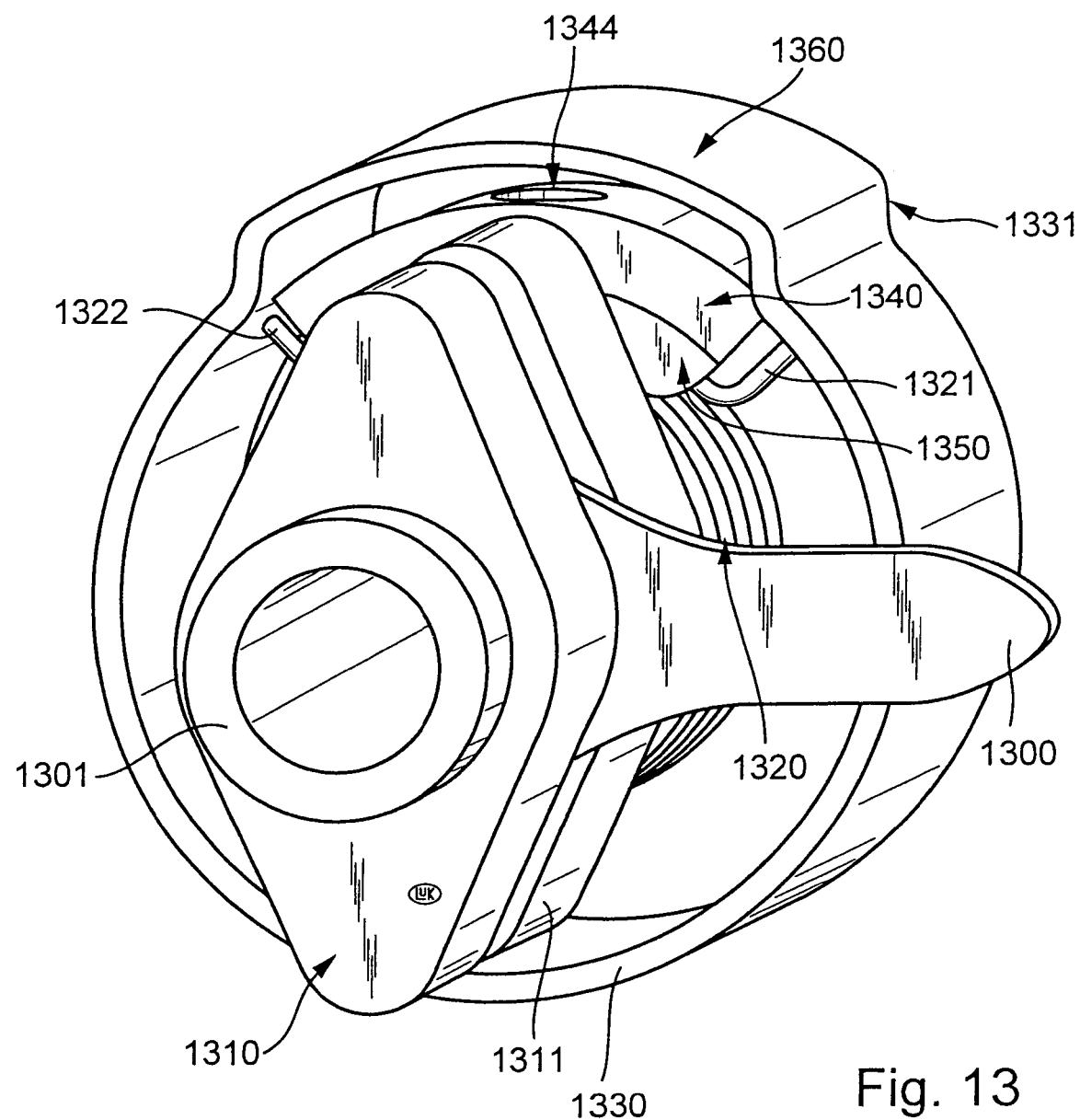
FIG. 13 shows an arrangement of a primary actuation element and a secondary actuation element in accordance with an embodiment of the invention.
Figure 14:
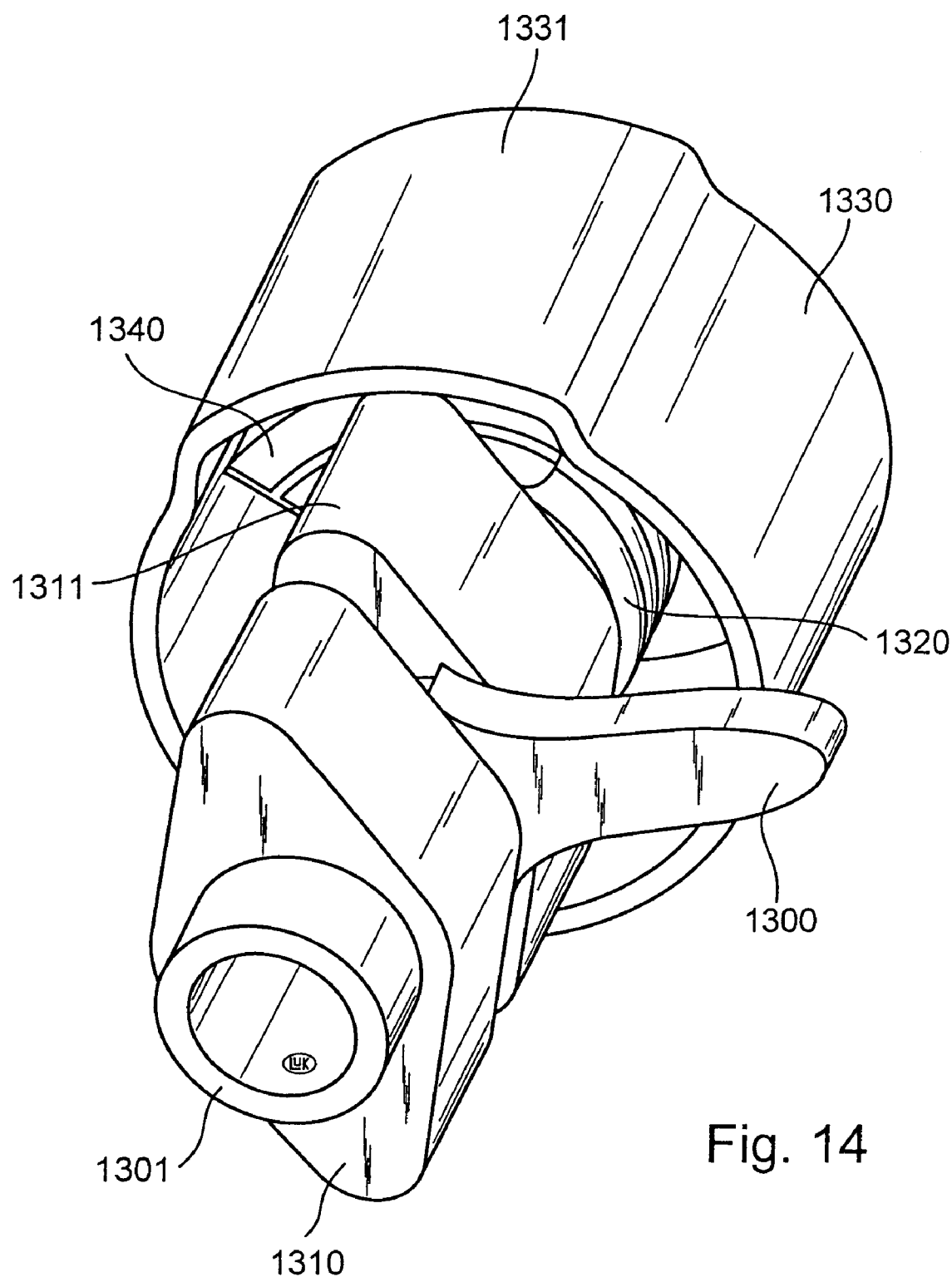
FIG. 14 shows an arrangement of a primary actuation element and a secondary actuation element in accordance with an embodiment of the invention.
Figure 15:
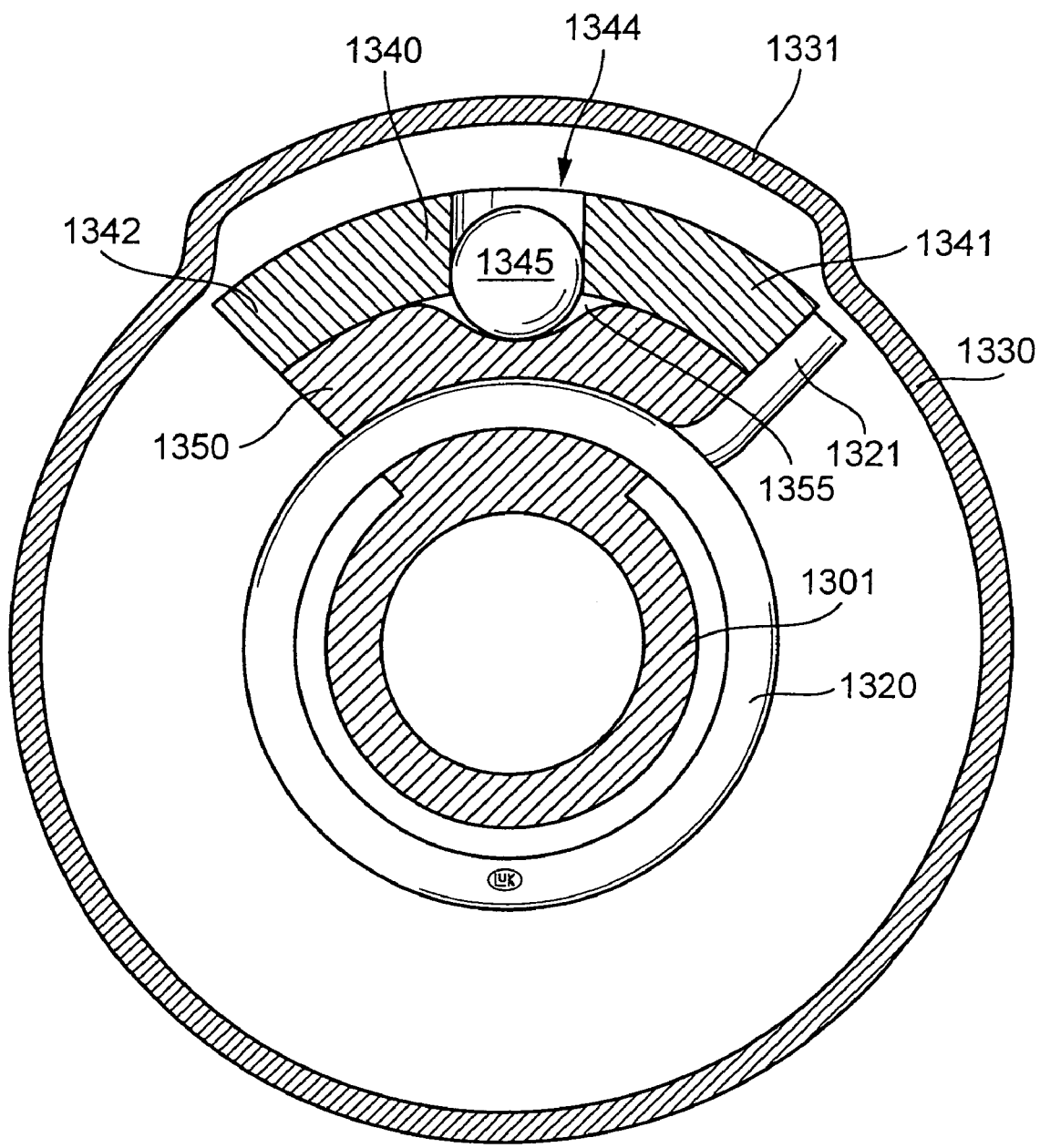
FIG. 15 shows an arrangement of a primary actuation element and a secondary actuation element in accordance with an embodiment of the invention.
Figure 16:
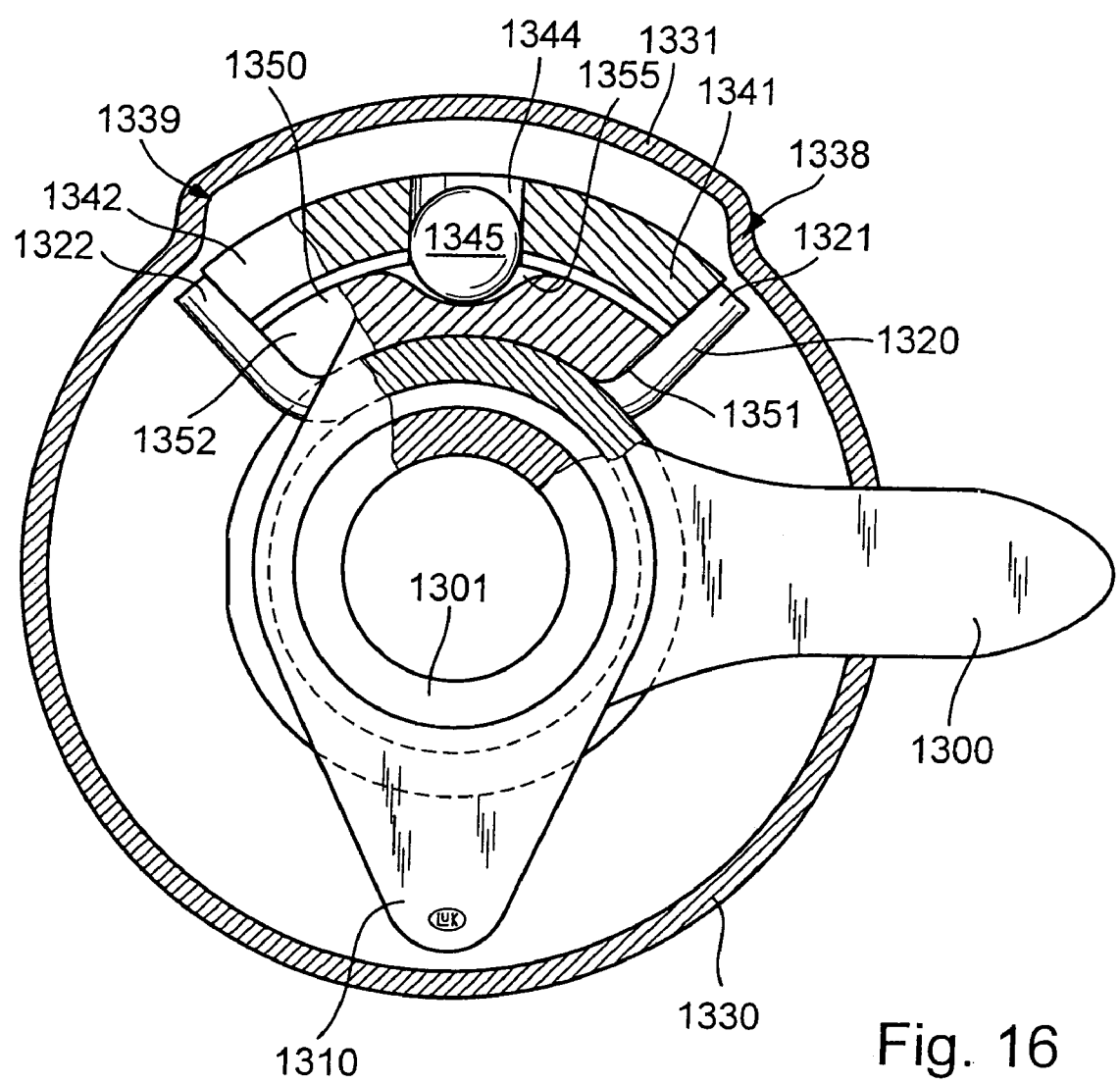
FIG. 16 shows an arrangement of a primary actuation element and a secondary actuation element in accordance with an embodiment of the invention.

A side element 1286 of FIG. 12a is shown in more detail in FIG. 12b. The element is manufactured from sheet metal, preferably in a punching process. Illustrated is an element with a shift finger 1288. In the flat state, the grooves are e.g. punched, and in a subsequent process the element 1287 is bent into the desired radius and equipped with flanges 1290.

In accordance with a further inventive concept, it is proposed that an electrical machine be provided in connection with the present transmission, whose rotor is connected, for example, with a freely rotatable centrifugal mass, which advantageously can be isolated from the drive unit, such as an internal combustion engine, and from the output unit, such as a transmission, by means of at least one clutch, so that by means of that arrangement hybrid drives are possible.

In accordance with that arrangement, the transmission makes possible a comprehensive utilization of the electrical machine, for example as a starter unit for the internal combustion engine, as a current generator, as a partial drive, as a full drive, as well as a unit for transforming kinetic energy into electrical energy or into kinetic rotational energy by use of the rotor as a centrifugal mass in retarding procedures of the vehicle with a disengaged internal combustion engine (recuperation).

FIGS. 13 to 16 show further advantageous embodiments of the invention. With these embodiments of the invention, a primary actuation element, such as, for example a shift finger, is non-rotatably connected with a selector shaft 1301. Furthermore, secondary actuation elements 1310, 1311, such as, for example, disengaging fingers, are provided, which are rotatable relative to the primary actuation element. Between the primary actuation element 1300 and the secondary actuation element, a spring or energy accumulator 1320 is arranged so that the secondary actuation elements are rotatable relative to the primary actuation element against the restoring force of the energy accumulator. The energy accumulator 1320 is constructed as a loop spring, whereby the spring is wound at least once, advantageously however several times, around the central shaft 1301. The spring has two end regions 1321 and 1322, which are essentially radially offset and are supported on respective contact regions. The contact regions are components of a blocking device (1360).

The blocking device (1360) has a cylindrical body 1330, which has a region 1331 of greater radial extent. Further elements are provided in the region of this section of greater radial extent, whereby an element 1340 is provided having contact regions 1341 and 1342 for support of the end regions of the spring. This element 1340 is formed as a segment of a cylinder segment and has an opening 1344 into which or through which an element 1345, such as, for example, a ball, is accommodated or can pass. Element 1340 is arranged in such a way that it is non-rotatably connected with or received in the shaft 1301 or the primary actuation element 1300. Furthermore, an element 1350 is provided, which is non-rotatably connected with the secondary actuation elements. Element 1350 is basically likewise formed as a segment of a cylinder, or of a segment of a hollow cylinder, and has contact regions 1351 and 1352 on its end areas for contacting the radially extending regions of the spring 1320. The spring is acted upon and is stressed by relative rotation of elements 1340 and 1350.

As a result of that rotation, the ball 1345, which lies in a depression 1355 in element 1350, is moved relative to element 1350 and travels up the inclined surface on the edge of the depression and extends from the opening 1344. In that way, the maximum relative rotation of the two parts 1350 and 1340 is restricted since the ball contacts the side surfaces 1338 and 1339, and further relative rotation is thereby prevented. As a result, relative rotation of the primary actuation element 1300 relative to the secondary actuation elements can take place, whereby rotation takes place against a restoring force and the maximum angle of rotation is restricted.

The invention furthermore relates to a transmission brake for a transmission. It is especially advantageous if that takes place with an integral transmission brake in accordance with the invention. Braking of the transmission input shaft (GE) to synchronous rotational speed should take place after disengagement of the old gear and before engaging the new gear. For that purpose, the central selector shaft of the transmission is supplemented by formed elements of the invention, see FIGS. 17a and 17b.

Thereby, when using a transmission having a one transmission input shaft, by actuation of the selector element or the selector actuator, a transmission brake can brake the one transmission input shaft. When using a transmission with at least two transmission input shafts, it can be appropriate if by the actuation of the selector actuator, a transmission brake is actuated or operated that brakes at least one and/or both transmission input shafts.

Figure 17A:
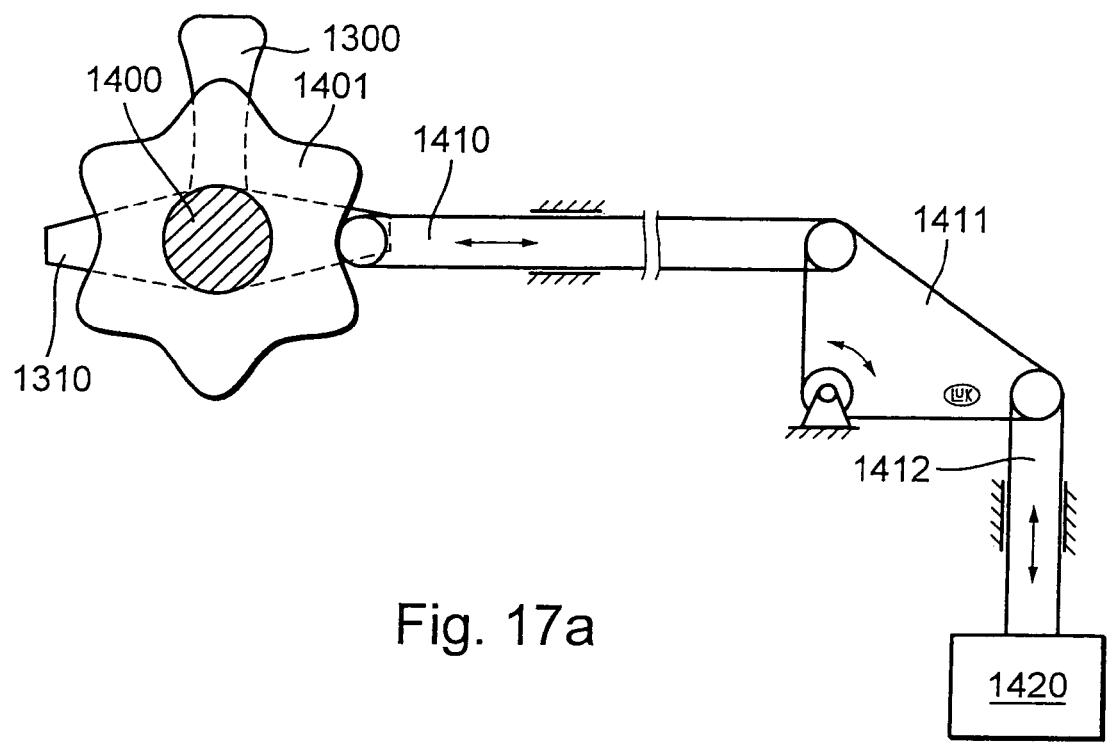
FIGS. 17–18 show arrangements of a final actuation mechanism with a transmission brake.
Figure 17B:
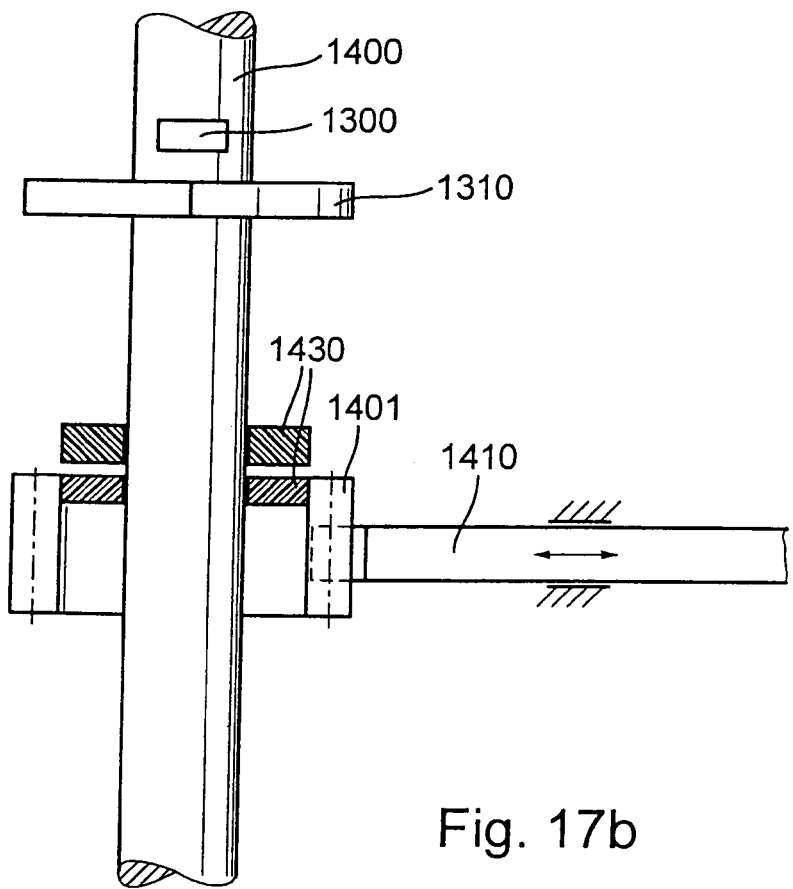

By using formed elements 1401 on the selector shaft 1400, a transmission brake 1420 is actuated by a push rod 1410, a diverting mechanism 1411, and a further push rod 1412. The transmission brake is represented in FIG. 17a as symbol 1420, which can be controlled.

Furthermore, it is advantageous if an additional clutch or brake element, for example a magnetic clutch, is installed. Although it does not directly operate the brake, but is mounted on the actuation element and controls it, it can be of very small and simple construction. The following results are achieved by the magnetic clutch: 1. When the synchronous rotational speed is reached, the magnetic clutch can be disengaged and the target gear can be immediately engaged. The residual rotational speed difference is minimal. Temperature dependence, drag torque, etc., can be neglected. 2. In downshifting, the magnetic clutch 1430 remains disengaged so that the transmission brake is not actuated.

Two basic functions are appropriate for the transmission brake: 1. At increasing engine torques, a transmission brake (for example, as a band brake) is so arranged that both transmission input shafts are constantly being braked. The short braking time (<1 sec.) of the active shaft will not be noticeable and can consequently be accepted. 2. At lower engine torques, separate brakes must be provided for each of the transmission input shafts, which are also actuated separately (thus through two magnetic clutches).

The inventive design makes possible the complete substitution of synchronizations of all gears. Their function is taken over by a transmission brake. Since the possibly available magnetic clutch is not installed on the brake itself, but on the actuation apparatus 1400, it can appropriately be of small and simple construction. The disengagement of the old gear, the synchronization, and the engagement of the new gear take place in one movement process without selector movement. Consequently, very short shift times are possible. The synchronous rotational speed can be set precisely.

Figure 18:
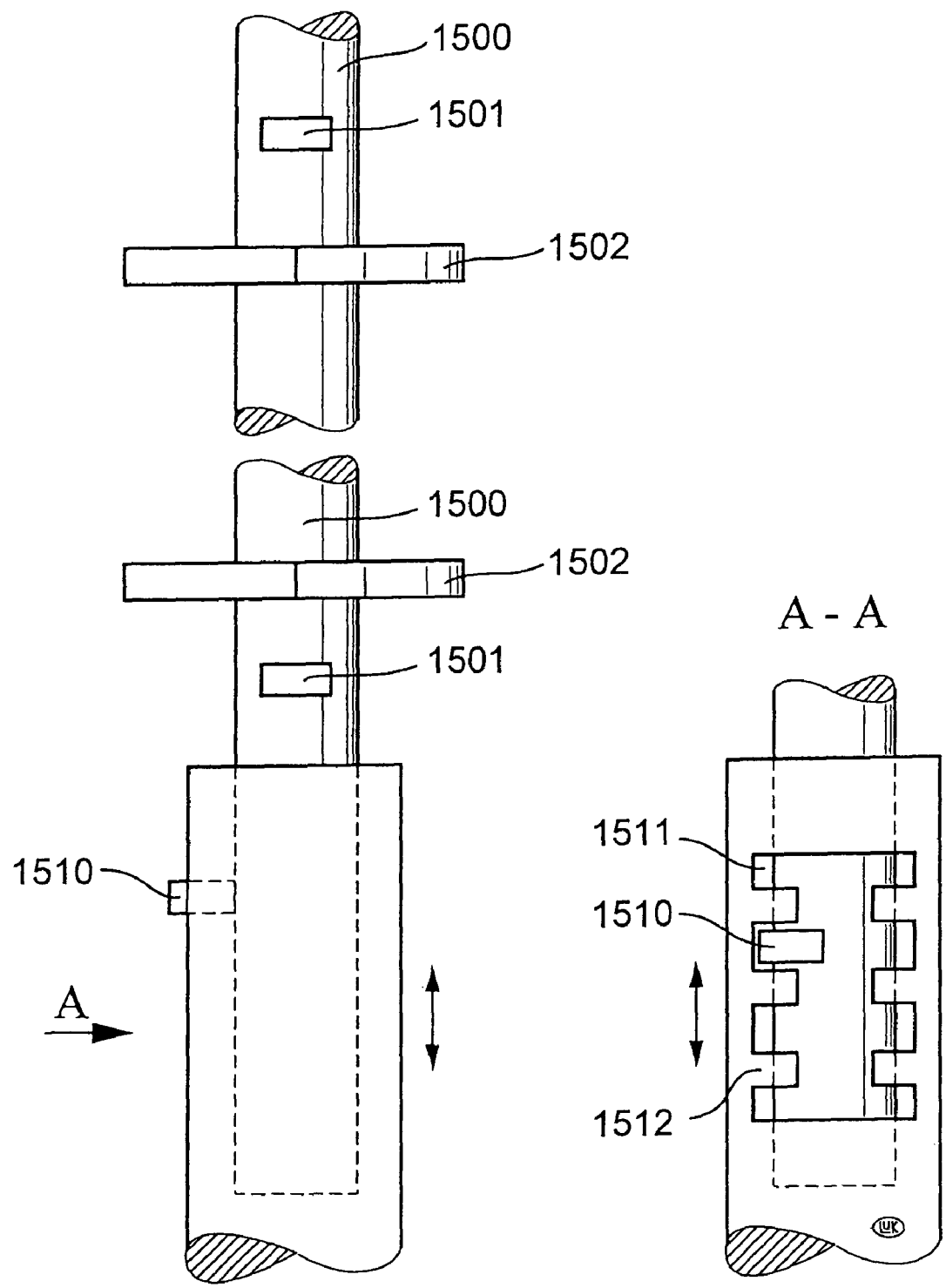

In accordance with a further object of the invention, it is appropriate if during upshifts the transmission input shaft of the target gear is slowed to synchronous rotational speed. That can take place by means of the above-mentioned transmission brake. Moreover, it is appropriate if the central selector shaft 1500 of the transmission is provided with an additional element 1510, similar to a selector finger 1501 or a disengagement cam 1502, which is arranged on the central selector shaft in addition to the previous actuation elements 1501, 1502 and engages the H-shift pattern 1511 of an additional sleeve 1512, see FIG. 18, whereby the H-shift pattern 1511 of the additional shift sleeve 1512 can be of a divided design and can be divided among several sleeves, which can be appropriately arranged on any desired place on the central selector shaft. Following the disengagement of the old gear by the disengagement cam 1502, the above-mentioned additional finger 1510 engages the H-shift pattern 1511 of the additional sleeve 1512. That sleeve is axially displaceable along the central selector shaft and acts axially on the transmission brake. The central selector shaft is moved slightly in the selection direction by the selector motor of the transmission, whereby both directions are possible. In that way, the transmission brake is actuated. When the synchronous rotational speed is attained, the new gear can be engaged by the selector finger 1501 without selection motions being necessary, since the selector finger 1501 remains in the passageway of the target gear during the synchronization process. The width of the passageway can moreover be slightly widened in order to prevent the shift finger from leaving the passageway during the synchronization process by means of the transmission brake. Through a suitable construction of the transmission brake, it is possible to synchronize the gears on the hollow shaft or the full shaft in any given case using the two axial actuation directions ("up" or "down"). The above-described inventive arrangement makes the substitution of synchronizations in all gears possible. Their function is taken over by a transmission brake. Aside from the additional finger 1510 on the central selector shaft 1500 and the sleeve 1512 as actuation apparatus for the transmission brake, basically no additional actuation elements are necessary. The disengagement of the old gear, the synchronization, and the engagement of the new gear take place in one movement process. Consequently, very short shift times are possible. The synchronous rotational speed can also be precisely set.

Because the available axial space between two shift passageways cannot as a rule simply be extended, the path that is necessary for the actuation of the above-described transmission brake by the selection actuator—that is, an axial displacement of the selector shaft—can be limited. In order to minimize that path, it can be advantageous to install inclined entrances on the components of the shift passageways, but at least on the components for forming the shift passageways for the brakes, along which the shift finger slides during a shift actuation, so that at the time of a shift movement (rotational movement of the selector shaft), the shift finger causes an axial displacement of the shift fork along the inclined entrances, which already can be utilized for initiating the braking process. Advantageously, the axial path is utilized for releasing the brake, since a correspondingly small torque need be applied for that purpose by the shift actuator.

Figure 19:
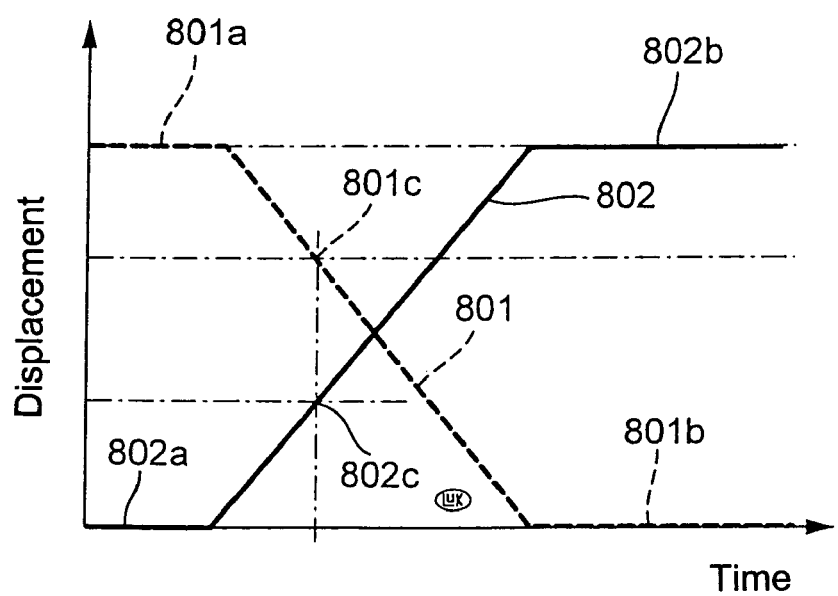
FIG. 19 shows a path-time diagram for a shift process in an automated shift transmission with tractive force interruption with overlapping disengagement and engagement processes.

FIG. 19 shows a shift process between two transmission ratio steps that are arranged in different shift passageways, for example with a shift from gear 2 to gear 3 or from gear 4 to gear 5 in an automated shift transmission with an H-shift arrangement. In the displacement-time diagram illustrated in FIG. 19, the distance covered by the sliding sleeve of a first, currently engaged gear or transmission ratio step, during the shift process from an end position 801*a* in the engaged condition into the neutral position 801*b* when no longer in the engaged condition, is shown as a function of time as a dashed line 801. The solid line 802 shows the displacement of a sliding sleeve of a gear not currently engaged proceeding from a not engaged, neutral initial position 802*a* to the engaged condition 802*b*. When the form lock between the transmission input shaft and the transmission output shaft of the currently engaged gear is practically terminated in the path 801*c* of the sliding sleeve, the synchronization of the new gear to be engaged begins in the path 802*c* of the sliding sleeve.

Figure 20:
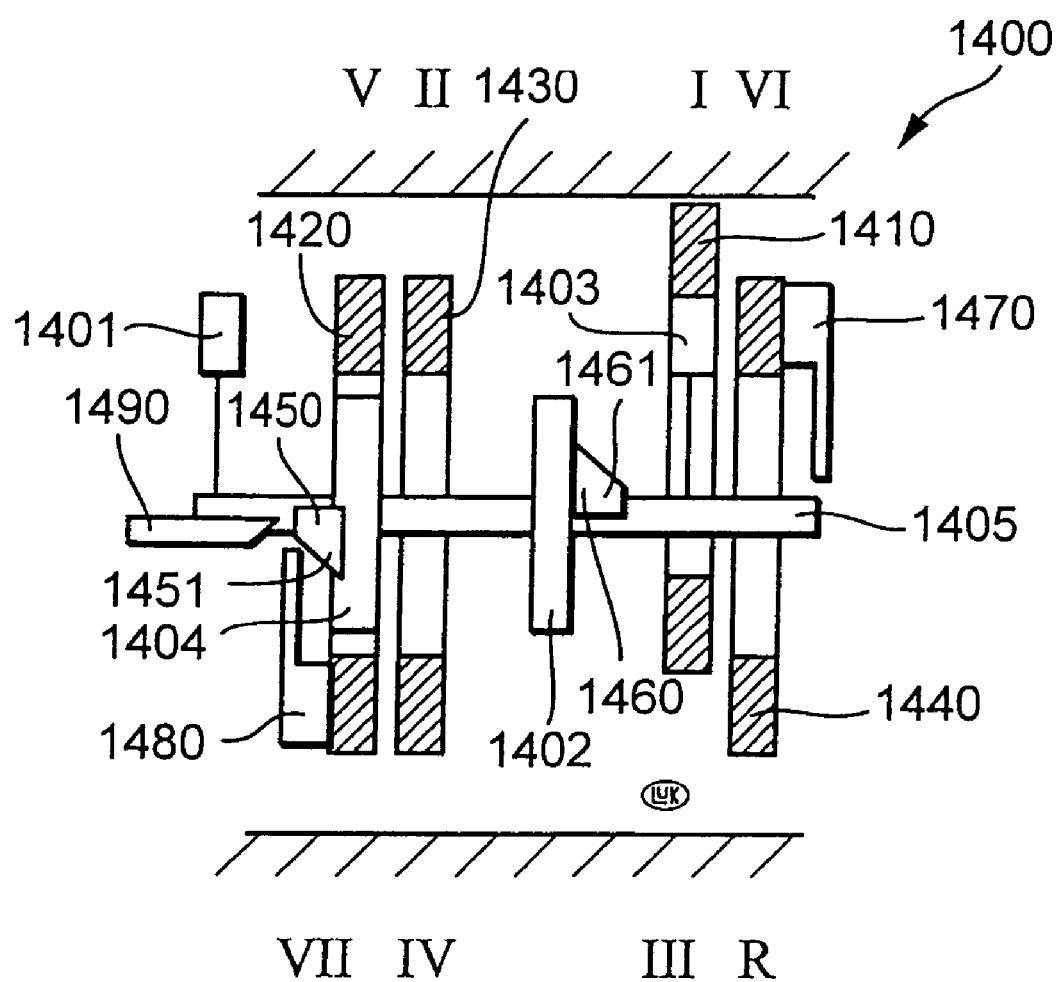
FIG. 20 shows a final actuation mechanism for a double-clutch transmission with synchronization devices at the highest gear.

FIG. 20 shows schematically a final actuation mechanism similar to FIG. 7 for a double clutch transmission with the gears or transmission ratio steps 1, 2, 3, 4, 5, 6, 7, and reverse gear R. Here the transmission ratio steps 1, 3, 5, 7 are associated with a first transmission branch and transmission ratio steps 2, 4, 6, R are associated with a second transmission branch. Gears 1 and 3 are shifted using the final output mechanism 1410, consisting, for example, of a shift jaw, a shift fork, and a sliding sleeve, gears 5, 7 are shifted by means of the final output mechanism 1420, gears 2, 4 are shifted by means of the final output mechanism 1430, and gears 6, R are shifted using final output mechanism 1440, in which in each case one of the primary actuation elements engages the end output mechanisms, such as shift fingers 1401, 1403, whereby they are attached to the selector shaft 1405 and by rotation they displace the final output mechanisms, and they thereby engage the connected gear. The previously engaged gears are first disengaged by means of the same rotational movement that is utilized for engaging a new gear to be engaged, practically simultaneously or with a certain time offset, by means of secondary actuation elements 1404, 1404. In the arrangement illustrated, in each case at least one (not shown in detail) synchronization device is provided on gears 6, 7 with the highest transmission ratio of the transmission gears. The actuation of the synchronization device does not take place, as opposed to the sequence described in connection with FIG. 7, using a primary actuation element, but during a selection movement by axial displacement of the selector shaft 1405 and/or a shift movement by rotation of the selector shaft 1405. For that purpose, cams 1450, 1460 are provided on the selector shaft 1405 in the region of the secondary actuation elements 1402, 1404, diminishing radially from them, which by reciprocal action push mating cams 1470, 1480, which are securely arranged on the end actuation elements 1420, 1440 for actuation of the respective highest gears. The contact of the mating cam 1480 takes place during a selection movement, that is, during the axial displacement of the selector shaft 1405. The respective mating cams 1470, 1480 are displaced perpendicular to the longitudinal axis of the selector shaft 1405 and thereby contact the synchronization device through a force transmission along the ramp 1451 or 1461 of the cams 1450, 1460. If the cams 1450, 1460 additionally have a positive radial component running in the circumferential direction, contact with one of the mating cams 1470, 1480 additionally in a rotational movement of the selector shaft. For that purpose, cams 1450, 1460, and mating cams 1480 or 1470, then are axially opposite at the same height if a primary or secondary actuation element is located in a shift passageway. The spiral cam 1490 acts upon the mating cam 1480 during a rotational movement of the selector shaft, that is, during a shift process or, for example, during a rotational movement of the selector shaft 1405, and actuates the synchronization device if no selection movement but merely a shifting motion of the selector shaft is provided. For that purpose, spiral cam 1490 has a radial profile that increases radially over the circumference, that is, it has a spiral or a helical surface profile at right angles to the axis of rotation of the selector shaft. Furthermore, an inclined entrance can be provided in the direction of movement toward the mating cam 1480.

Figure 21A:
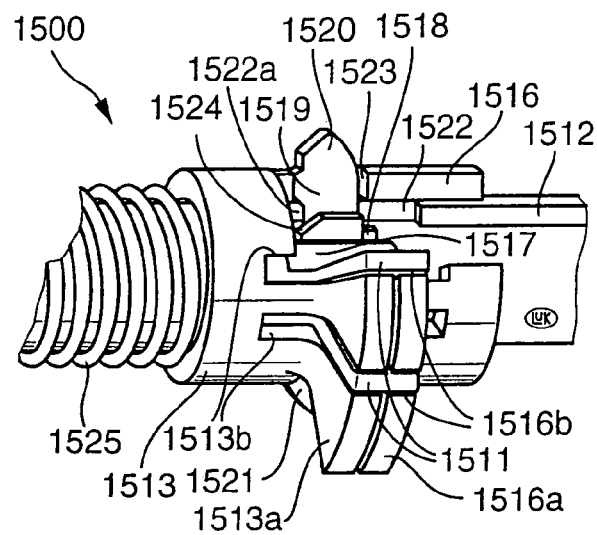
FIGS. 21a–c show views of a final actuation mechanism for rotary selection shift and slide shift actuation.
Figure 21B:
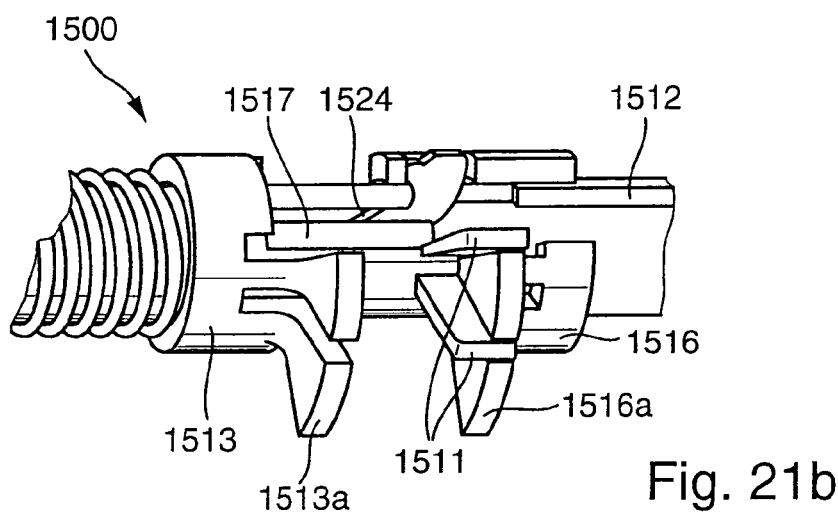
Figure 21C:
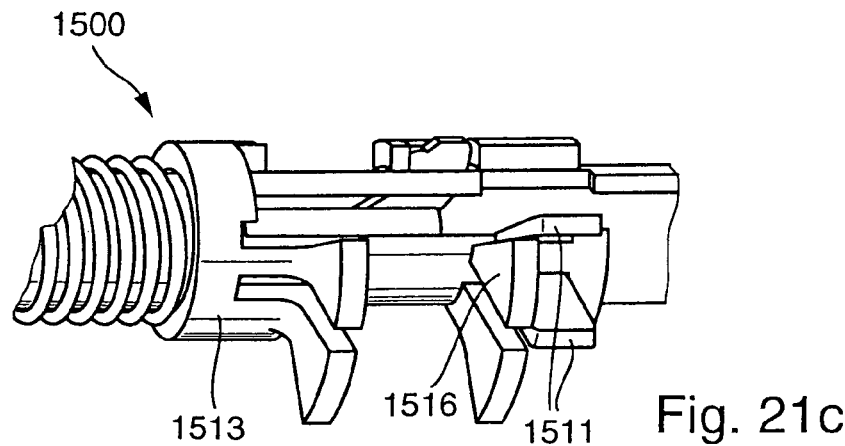

FIGS. 21*a* to 21*c* illustrate by way of example, and in fragmentary perspective views, a final actuation mechanism 1500 for a sliding shift and a selection rotation movement, which preferably—but not exclusively—can find use for longitudinal incorporation of the transmission in a motor vehicle. FIG. 21*a* shows the final actuation mechanism 1500 in the neutral position. Two secondary actuation elements 1513, 1516 with flange-like radial extensions 1513*a*, 1516*a*, which enter into interaction with correspondingly arranged, but not illustrated, final output mechanisms, such as shift jaws of a sliding sleeve are arranged on the outer circumference of a central, internally hollow selector shaft 1512 that is axially displaceable by a transmission actuator, for example by means of an electric motor, so that with an axial displacement of the secondary actuation elements 1513, 1516, an engaged gear is disengaged. The secondary actuation elements 1513, 1516 have longitudinal slots 1513*b*, 1516*b* that are radially penetrated by primary actuation elements 1511. The primary actuation elements 1511 are installed offset from each other on the periphery of the central selector shaft 1512 and interact with the final output mechanisms of the transmission during an axial displacement of the central selector shaft 1512 so that an engaged gear can be disengaged and a new gear can be engaged. That is, the primary actuation elements 1511, in contrast to the secondary actuation elements 1513, 1516, can connect with an engagement surface of a respective shift jaw in both directions during an axial displacement of the selector shaft 1512.

The axial displacement of both secondary actuation elements 1513, 1516 relative to the selector shaft 1512 takes place by means of a push rod 1517 that is securely connected on one end with a transmission housing or a transmission actuator housing, and which is guided in the interior of the selector shaft 1512, and has at its other end a longitudinal slot 1518 in which a control element 1519 is rotatably accommodated along the longitudinal slot 1518. The control element 1519, through two radially widened cams 1520, 1521 that are preferably offset by 180°, extend through a longitudinal slot 1522 in the selector shaft 1512 and into a guide slot 1523 in the secondary actuation elements 1513, 1561. At least one cam 1520, 1521 has a control edge 1524 associated with the longitudinal slot 1522, and which interacts with a correspondingly matched edge 1522*a* during axial displacement of the selector shaft 1512, and thereby rotates the control element 1519, whereby both secondary actuation elements 1513, 1516 are displaced axially in relation to each other. It should be understood that for optimizing kinematics, cams 1520, 1521 and slots 1523 are coordinated with one another.

The displacement of the sliding sleeve 1512 can take place against the action of an axially acting energy storage unit, so that it need only move in one direction, actuated by an actuator, whereby it is reset by releasing the energy storage unit. That is, for example, as in the embodiment illustrated in FIG. 21*a*, constructed in such a way that the secondary actuation element 1513 is biased by means of a helical spring 1525, which is braced at one axial end on a housing element and at the other end on the secondary actuation element 1513. The helical spring 1525 is placed under tension during an axial displacement of the selector shaft 1512 along the functional chain by the cam 1521, the control element 1519, and the push rod 1517 that is securely mounted on a housing.

The selector shaft 1512 is rotatable to execute the selection process. Upon rotation of the selector shaft 1512, the primary actuation elements 1511 are rotated into the corresponding shift passageways of the transmission, wherein the shift passageways are arranged about the selector shaft. The rotation obviously takes place such that two primary actuation elements 1511 are never found at the same time in one shift passageway in any given case.

FIG. 21*b* shows the final actuation mechanism 1500 with secondary actuation elements 1513, 1516 displaced in relation to one another as a result of a displacement of the selector shaft 1512 against the push rod 1517. The displacement of both secondary actuation elements 1513, 1516 takes place just so far until the operating engagement of the radial extensions 1513*a*, 1516*a* into the shift jaws has disengaged the engaged gear. In this position, the secondary actuation elements 1513, 1516 secure the unintended engagement of a gear not desired, in that they prevent corresponding final output elements from displacement. The primary actuation elements 1511 are in this phase at an equal axial extent as the secondary actuation elements 1513, 1516. The control edge 1524 determines the extent of radial excursion of the secondary actuation elements 1513, 1516 and in this phase loses operating contact with the selector shaft 1512, so that with its further displacement the secondary actuation elements are no longer moved further axially toward one another, and an axial displacement of the primary actuation elements 1511 takes place in relation to secondary actuation elements 1513, 1516. This is apparent from FIG. 21*c*, which shows the final condition of the final actuation apparatus 1500 after a shift process. Here the corresponding gear is engaged by a primary actuation element 1511 through the further axial displacement of the primary actuation elements 1511 by the secondary actuation elements 1513, 1516. The second primary actuation element hereby—depending upon the selection function, that is, the rotation position of the selector shaft 1512—runs idle or can execute an additionally desired function, for example activate a parking brake when during the motor vehicle is at rest. Alternatively, two gears can be engaged at the same time to serve as a parking brake, as a result of which the transmission is blocked.

Figure 22:
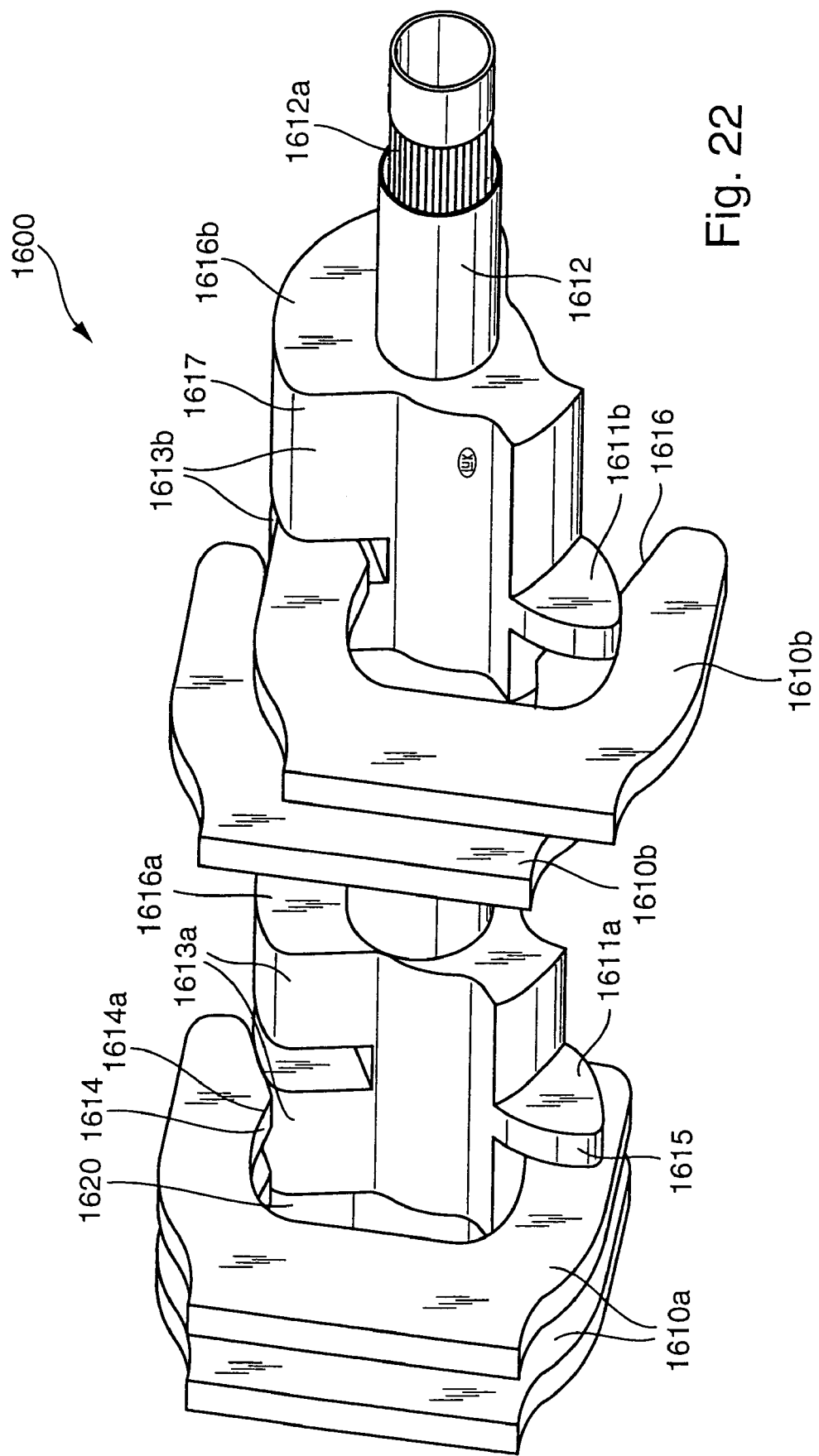
FIG. 22 shows a view of a final actuation mechanism for rotary shift and slide selection actuation, FIGS. 23a, b show perspective views of a transmission actuator unit with a final actuation mechanism, FIGS. 24a, b show an exemplary arrangement of a selector shift rail, FIGS. 25a, b show schematic representations of an embodiment of a final actuation mechanism.

FIG. 22 shows a final actuation mechanism 1600 for rotational shifting and sliding selection actuation that is especially advantageous for use for motor vehicles that have a transversely-mounted transmission, relative to the direction of vehicle travel. The selector shaft 1612, depending on whether it acts in an automated or a manual transmission, can be rotated and be axially displaced, respectively, by a corresponding actuation device (not shown), in order to carry out the shift processes in the transmission. In the case of a manual shift actuation without automation of the transmission, it is furthermore advantageous to configure the primary actuation elements 1611*a*, 1611*b* such that they form with the shift forks 1610*a*, 1610*b* an involute engagement without play. It should be understood that in other, similar embodiments, the arrangement and number of the shift forks 1610*a*, 1610*b* can be such that a single primary actuation element 1611*a* can act upon all shift forks. With automated shift transmissions, the means for actuating the gears can be shift and selection actuators, for example electric motors, or with a manually actuated transmission articulated levers for Bowden cables or shift rods. The use of a single transmission version for a manual and an automated shift transmission is advantageous, in which merely the selector shaft 1612, or according to a further inventive concept an extension connected in a form-locking manner with the selector shaft 1612, for example by means of gear teeth 1612a, on which the transmission actuator or manual actuation device engages, is advantageous.

The primary actuation elements 1611a, 1611b and the secondary actuation elements 1613a, 1613b are provided on the selector shaft 1612. Particularly advantageous is the one-piece design of secondary and primary actuation elements, for example from a reworked cast or forged element, as a single component 1616a, 1616b. Furthermore, the selector shaft 1612 and components 1616a, 1616b can be constructed in one piece in the same manner. The primary and secondary actuation elements 1611a, 1613a actuate the final output elements such as shift forks 1610a, and the primary and secondary actuation elements 1611 b, 1613b activate the final output elements such as shift forks 1610b by means of engagement with the shift jaw 1620 of the final output elements. The transmission input shaft (not shown) with the idler gears for the corresponding gears, which are connected in a form-locking manner with the transmission input shaft upon shifting gears using sliding sleeves that are axially displaced by the shift forks 1610a, 1610b, runs between the two shift fork groups 1610a, 1610b substantially perpendicular to the selector shaft 1612. The primary actuation elements 1611a, 1611b engage form-locking into the shift jaws 1614 and displace the shift forks 1610a, 1610b perpendicular to the selector shaft upon a rotation of the selector shaft 1612 insofar as the corresponding shift fork was selected previously. That means that the corresponding primary actuation element 1611a, 1611b was previously brought to an axial position equal to that of the corresponding shift fork 1610a, 1610b by an axial displacement of the selector shaft 1612. The profiling 1614a of the shift jaws 1614 and the profiling 1615 of the primary actuation elements 1611a, 1611b, which can be constructed as cams, are adjusted to each other such that it results in an involute rolling of the profiles 1614a, 1615 on one another. The stroke of the shift forks 1610a, 1610b moreover suffices to completely engage the two gears engageable by means of the sliding sleeve, whereby an engaged gear is disengaged in the same shift passageway as in the operating region of the same shift fork 1610a, 1610b as a consequence of the displacement of the shift forks 1610a, 1610b for engaging the new gear by the primary actuation element 1611a, 1611b. The profile 1614a for rolling on the primary actuation elements 1611a, 1611b transitions into an involute profile 1616 in the direction of the fork ends of shift forks 1610a, 1610b, which can operatively engage with the involute profile 1617 of the secondary actuation elements 1613a, 1613b. The axial extension of the secondary actuation elements 1613a, 1613b is designed such that at least two shift forks 1610a, 1610b can enter into operating engagement with a secondary actuation element in any given case, whereby the primary actuation elements 1611a, 1611b are in each case axially enclosed by a secondary actuation element 1613a, 1613b, so that so that when engaging a gear by means of the primary actuation element 1611 a, 1611 b, all gears normally the currently engaged gear—are previously disengaged. The primary actuation elements 1611a, 1611b are axially spaced such that only one primary actuation element 1611a, 1611b can constantly engage a gear. Advantageously, shift forks 1610a or 1611b are arranged in gaps for that purpose, so that during a shift process by the primary actuation element 1611a, 1611b of a group the primary actuation element 1611b, 1611a of the other shift fork group is rotated between the shift forks.

Figure 23A:
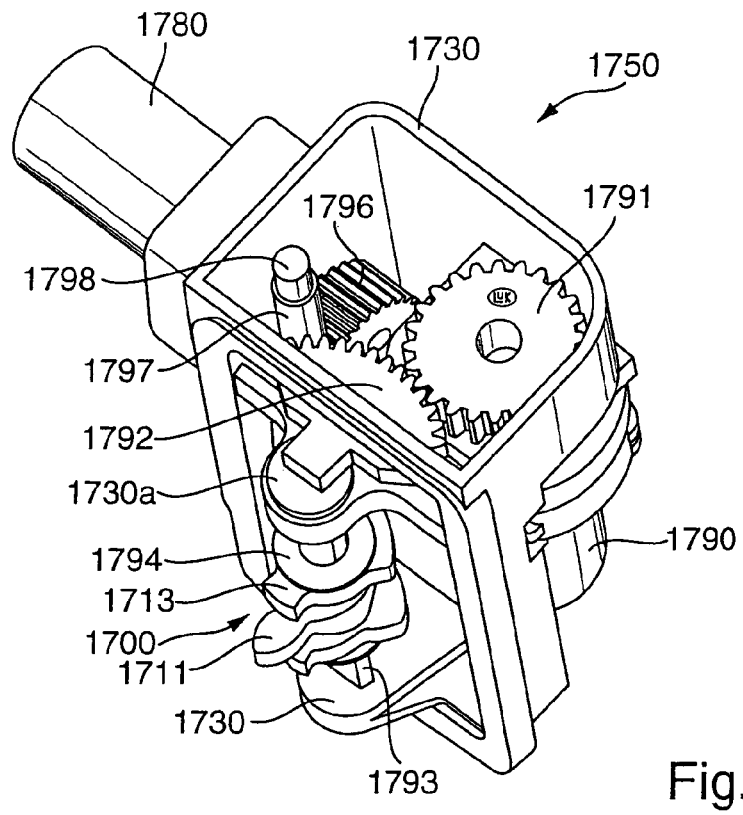
Figure 23B:
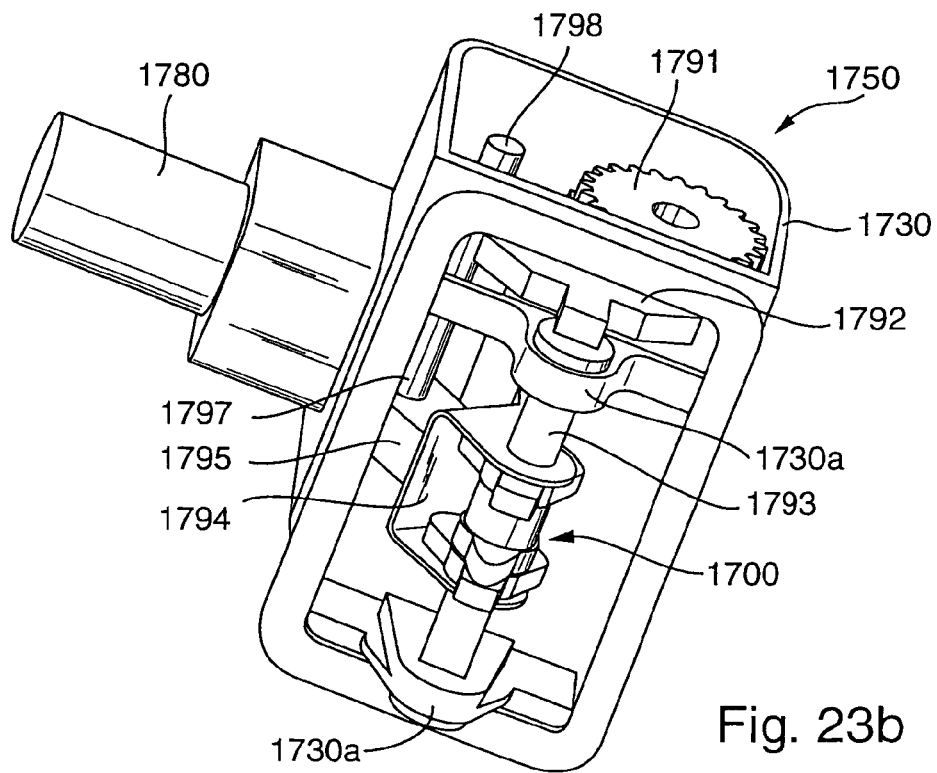

FIGS. 23a and 23b show an embodiment of a transmission actuator unit 1750 in different, cutaway perspective views. The transmission actuator unit 1750 is usable for any type of final actuation mechanism, especially with the final actuation mechanism 1700 in accordance with the inventive concept. The components of the transmission actuator unit 1750 are accommodated in a housing 1730 that is directly connectable with the transmission housing as a so-called "add on" component, for example by means of screws, interlocking devices, or the like. The transmission actuators 1780, 1790 are arranged on the housing 1730 preferably perpendicularly relative to each other with reference to their operational axes, whereby the actuator housings and housing 1730 are securely connected with each other. The transmission actuators 1780, 1790 can be constructed as rotary drives of any type, advantageously utilizing electric motors that are preferably constructed small and compact, since the permanent magnets are made of rare earth metals for increasing the magnetic field strength in the space available. Advantageously, the electric motors can be of brushless construction, whereby excitation of the electromagnetic field for their operation can take place commutatively. Moreover, the rotor can carry the permanent magnets and the excitation winding can be provided in the stator. The use of commutatively operated electric motors of that type permits a reduction of the space occupied by the transmission actuators, such that in relation to the actuation means for manual actuation of the transmission by Bowden cables or shift rods, basically no increased space requirement exists so that in designing the engine compartment of a motor vehicle basically no construction distinction need be made between automated and manually actuated transmissions. Especially for disengaging clutches, for example a clutch actuator such as the actuator 46 in FIG. 1a, electric motors of that type can additionally or alternatively be advantageous in the power branch of a motor vehicle. Here the electric motor can be provided as an actuator that has its operating axis arranged parallel to the transmission input shaft for actuating a lever mechanism, or that is arranged concentrically relative to the transmission input shaft, acting as a hydraulic master cylinder operating on a slave cylinder for actuation of the clutch. Of course, electric motors of that type can be advantageous for all transmission actuators and clutch actuators, in addition to the final actuation mechanism in accordance with the inventive concept.

The housing 1730 is formed as a unit to reduce construction space further, in order to accommodate the transmission actuator 1790 without substantial increase in spatial extension. The transmission actuator 1780 preferably extends substantially perpendicularly from the housing 1730, in the direction in which usually Bowden cables or shift rods are fed.

In this embodiment, one transmission actuator 1790 is provided as a shift actuator and one as a selection actuator 1780 in order for the final actuation mechanism to execute rotary and linear displacement movements for selecting and shifting the gear. The shift actuator 1790 brings about the rotary motion of the final actuation mechanism 1700 in that it creates a form lock using a wheel 1791 with an outer profile, for example, a gear, in a drive element 1792 with a complementary outer profile, for example a sector gear. The drive element 1792 is preferably connected in one piece with an axially fixed rod 1793, which is mounted in a rotatable and axially fixed manner by means of two bearing blocks 1730a connected with the housing 1730 or formed in it. The primary and secondary actuation elements 1711, 1713 are axially displaceably and non-rotatably carried on the rod 1793 and are embraced on both axial sides by a surrounding coupling 1794 that contacts them for axial displacement. The coupling 1794 is securely axially connected with a sleeve 1797 by an extension 1795, wherein the sleeve is axially displaceable relative to the housing 1730, for example along a rod 1798 provided in the housing, and is driven by the selection actuator 1780 by means of a form locking connection. For that purpose, the transmission actuator, by means of a profiled drive wheel 1796, such as a gear, engages with a corresponding linear profile (not shown) on the sleeve 1797.

An uncoupled movement of the shift and selection functions is possible as a result of the structure of the transmission actuator unit 1750. Because of the construction of important components, for example the rod 1793 with toothed segment 1792, coupling 1794, housing 1730, etc., as sheet metal parts that can be appropriately formed and stamped, the embodiment can be produced correspondingly economically.

FIGS. 24*a* and 24*b* show, by way of example, shift rails 1810, 1811 arranged one above the other, which in any given case contact a sliding sleeve during a displacement in the direction of arrow 1810*a* for engaging one of the two gears associated with it. In order to bring about engagement and disengagement processes in the case of a selection by the selection actuator, primary and secondary actuation means (not shown) engage a respective shift jaw 1814, 1814*a*. The embodiment of FIG. 24*a* shows a view of half of the two shift rails 1810, 1811 in FIG. 24*b*. It should be understood that several such shift rails 1810 can be arranged one above another to form a final actuation mechanism. Since a shift rail such as represented by shift rail 1810 can be operative in a double clutch transmission, such as shown, for example in FIG. 2, for one gear group, and can engage or disengage a gear security is provided against movements of the shift rail 1811 that shifts the gears of the other gear group, which takes place only by means of undercuts and latchings provided for that purpose. In order to bring about improved security in that regard for the shift rails 1810, 1811 of a respective gear group, and thus prevent an unintended engagement or disengagement of a gear of another gear group, a stop can be provided that blocks the shift rails 1810, 1811 of a respective gear group. The stop consists of a rail 1886 coupled kinematically with the selection movement along the direction of arrow 1885, and that is guided along the selection direction 1885 into recesses 1888*a*, 1888*b*, 1888*c*, 1888*c*' of shift rails 1810, 1811 upon a displacement of the rail 1886. Recesses 1887*a*, 1887*b*, 1887*c* are provided in rail 1886 such that upon adjustment of a slot 1887*a*, 1887*b*, 1887*c* to the height of one of shift rails 1810, 1811, for example shift rail 1810 in the embodiment of FIG. 24*b*, it allows a shift movement in the direction 1810*a*. The remaining shift rails are blocked by means of the rail 1886. The blockage of shift rails 1810, 1811 thus takes place in the shift condition in which the shift rails 1810, 1811 are found, for example for the condition illustrated, in the central recesses 1887*b* of the neutral position. The surrounding recesses 1887*a*, 1887*c*, 1887*c*' are provided for the shift conditions of one of the two gears shiftable by the shift rails 1810, 1811.

The embodiment shows an arrangement of adjacent shift rails 1810, 1811 that are associated with different gear groups. The arrangement of the shift rails 1810, 1811 associated with different gear groups can be alternatingly adjacent or be arranged by gear groups, whereby in that case the position of the recesses 1887*a*, 1887*b*, 1887*c* should be changed correspondingly in relation to the embodiment illustrated.

FIGS. 25*a* and 25*b* show schematically and for example for gears 1, 2, 3, 4, the final actuation mechanism 1900 with the selector shaft 1912, the primary actuation elements 1911, and the secondary actuation elements 1913, as well as the shift fork 1910 for gears 1 and 2 and the shift fork 1910*a* for gears 3 and 4. The primary and secondary actuation elements 1911*a*, 1913*a* are of cam-like form, FIG. 25*b* represents them in positions in which no engagement with the shift forks takes place. The engagement surfaces 1920*a*, 1920*b*, 1921*a*, 1921*b* of shift forks 1910, 1910*a* are inclined relative to the primary and secondary actuation elements 1911, 1913, so that by their engagement during an axial displacement of the selector shaft 1912 they can likewise be partially displaced. In that way, a sliding sleeve can be moved by displacement of the shift forks 1910, 1910*a* during the selection process, whereby in the selection phase, for example using a secondary actuation element 1913, an engaged gear can be at least partially disengaged and/or a gear to be engaged can be biased to the synchronous position by means of the primary actuation element 1911. The various positions a, b, c of the shift forks 1910, 1910*a* in FIGS. 25*a*, 25*b* represent the shift positions of neutral for gears 14 (a), gear disengaged (b), and gear engaged (c).

The final actuation mechanism 1900 can be operated with the following shift strategies in the embodiment in the sketch, but not only in that way: A startup of sliding sleeve 1910 in position a during the selection movement on the radially outer edge 1910' with gear 2 disengaged and gear 1 engaged, thus a shift from gear 1 to gear 2 on which the radially outer edge 1910' of the sliding sleeve 1910 brings about a synchronization of gear 1 before gear 1 is disengaged by secondary actuation element 1913. If under the same conditions the radial inner edge 1910" is selected, gear 1 is first disengaged by the secondary actuation element 1912 and gear 2 is first engaged by the shift movement of the selector shaft 1912. If the transitions between primary and secondary elements 1911, 1913 are gradual relative to their radial extension, the coupling behavior between the new gear to be engaged and the gear to be disengaged can be further controlled.

Figure 26:
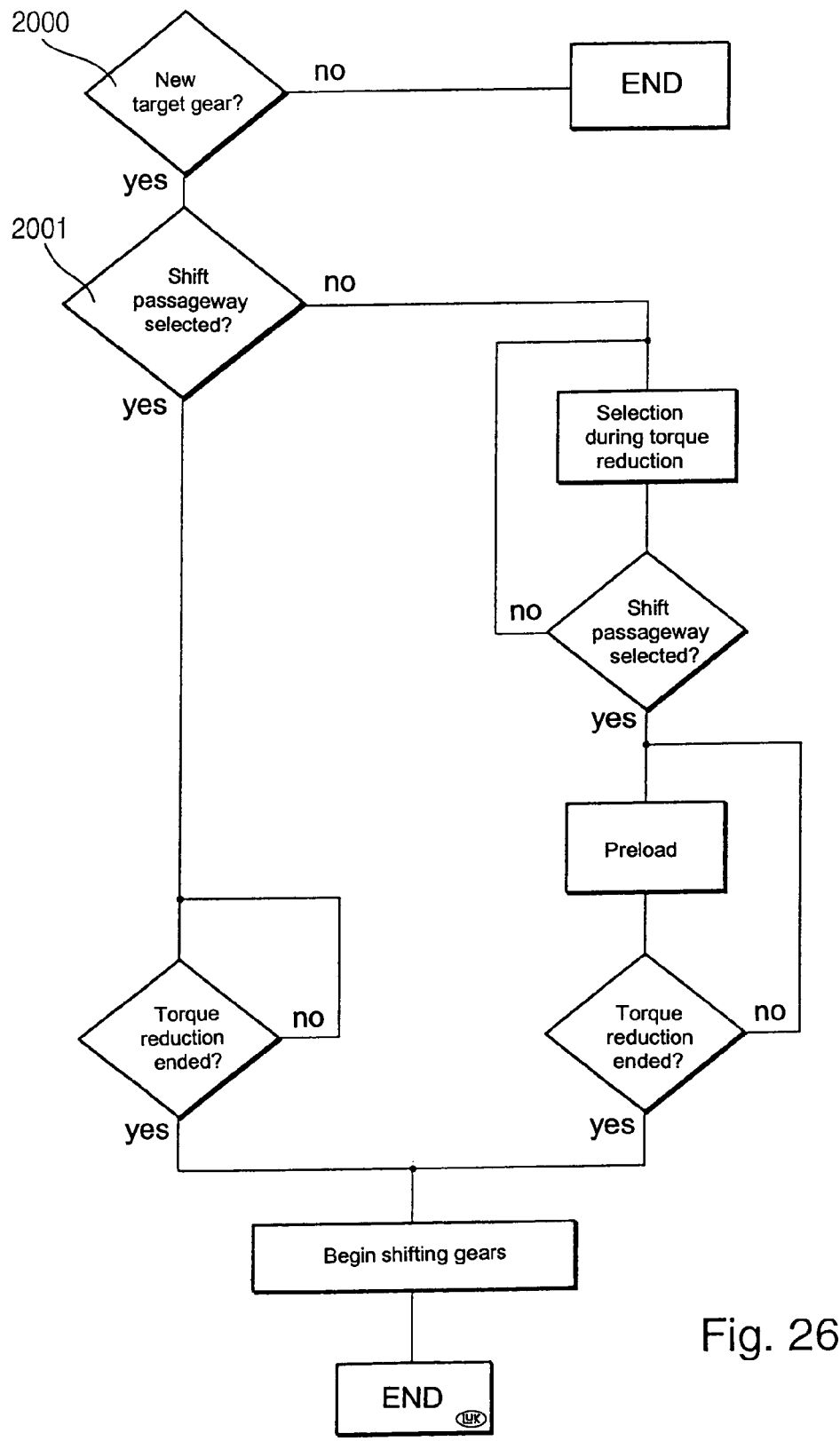
FIG. 26 shows an embodiment of a routine for shifting gears.

FIG. 26 shows a flow diagram during a typical gear shift by means of a final actuation mechanism as described by way of example in the previous Figures. If a new gear to be engaged is demanded in field 2000, whether the shift passageway relevant to the shift is already selected is determined in field 2001. If that is already the case, the torque is decreased.

The claims included in the application are illustrative and are without prejudice to acquiring wider patent protection. The applicant reserves the right to claim additional combinations of features disclosed in the specification and/or drawings.

The references contained in the dependent claims point to further developments of the object of the main claim by means of the features of the particular claim; they are not to be construed as a waiver of independent, objective protection for the combinations of features of the related dependent claims.

Although the subject matter of the dependent claims can constitute separate and independent inventions in the light of the state of the art on the priority date, the applicants reserve the right to make them the subject of independent claims or separate statements. They can, moreover, also embody independent inventions that can be produced from the independent developments of the subject matter of the included dependent claims.

The exemplary embodiments are not to be considered to be limitations of the invention. On the contrary, many changes and variations are possible within the scope of the invention in the existing disclosure, in particular such variants, elements, and combinations and/or materials which, for example, are inventive by combining or modifying single features that are in combination and are described individually in relation to the general specification and embodiments as well as the claims and shown in the drawings, as well as elements or method steps that can be derived by a person skilled in the art in the light of the disclosed solutions of the problem, and which by means of combined features lead to a new object or new method steps or sequences of method steps, as well as manufacturing, testing, and operational procedures.

What is claimed is:

1. A transmission for a motor vehicle, said transmission comprising; a plurality of sets of gears defining transmission ratio steps, wherein each set of gears includes a first gear non-rotatably connected with a first shaft and an idler gear connected with a second shaft, whereby transmission ratio steps are engaged by connecting an idler gear with a first gear by means of a final output element that is part of a final output mechanism and that is actuated by the final output mechanism with which a shaft bearing said element is connected and whereby a shift sequence of the transmission ratio steps is not established in the final outout mechanism, a plurality of side-by-side shift rails for shifting gear steps, and a stop rail operatively engageable with the shift rails for selectively blocking a shift rail to prevent unintended engagement or disengagement of a gear group, and in which the final output mechanism includes at least one primary actuation element which enters into an operative connection with final output mechanisms such that a transmission ratio step is engageable using a first final output mechanism and the at least one primary actuation element then can enter into operative connection with another final output mechanism without having to disengage a previously engaged transmission ratio step, wherein the final output mechanism includes at least one secondary actuation element.

2. A transmission according to claim 1, wherein as soon as the at least one primary actuation element enters into interaction with a final output mechanism, the at least one secondary actuation element can enter into interaction with at least one further final output mechanism.

3. A transmission according to claim 2, wherein the at least one further final output mechanism is associated with a still engaged transmission ratio step.

4. A transmission according to claim 2, wherein upon actuation of a final output mechanism for engaging a transmission ratio step using the at least one primary actuation element, at the same time at least one additional final output mechanism is actuated using at least the one secondary actuation element for disengaging the associated transmission ratio steps.

5. A transmission according to claim 2, wherein, when one gear is engaged, at least one gear not engaged is prevented from an unintended engagement using the at least one secondary actuation element if the primary actuation element of the engaged gear remains in the region of an end position, which establishes the engagement of the gear.

6. A transmission according to claim 1, wherein only one transmission ratio step is engageable at a time through the at least one primary actuation element.

7. A transmission according to claim 1, in which the transmission ratio steps form groups between which a tractive force interruption-free change can take place, wherein as soon as the at least one primary actuation element enters into operative connection with the final output mechanism of a group, the at least one secondary actuation element can enter into operative connection with at least one further final output mechanism of the same group.

8. A transmission according to claim 7, wherein the at least one further final output mechanism of the same group is associated with a still engaged transmission ratio step.

9. A transmission according to claim 7, wherein when one final output mechanism of a group is actuated for engaging a transmission ratio step using the at least one primary actuation element, at the same time at least one further final output mechanism of the same group is actuated using the at least one secondary actuation element for disengaging the associated transmission ratio steps.

10. A transmission according to claim 7. wherein as soon as the at least one primary actuation element enters into operative connection with a final output mechanism of a group, the at least one secondary actuation element enters into operative connection with no final actuation mechanism of the other group.

11. A transmission according to claim 7, wherein in any given case, when one gear of a group is engaged, at least one gear of this group which is not engaged is prevented from an unintended engagement using the at least one secondary actuation element if the primary actuation element of the engaged gear of this group remains in the region of the end position which fixes the engagement of this gear.

12. A transmission according to claim 7, wherein in any given case only one transmission ratio step is engageable at a time in each group.

13. A transmission according to claim 1, wherein the at least one primary actuation element is rotatable with restriction in relation to the at least one secondary actuation element against the action of an energy storage unit.

14. A transmission according to claim 2, wherein when a final output mechanism is actuated, the synchronization of an idler gear of a newly to be engaged transmission ratio step begins using the at least one primary actuation element before at least one further final output mechanism is actuated using the at least one secondary actuation element for disengaging the associated transmission ratio steps.

15. A transmission according to claim 14, wherein using the at least one secondary actuation element, the disengagement of the associated transmission ratio step takes place before the synchmnization of the one idler gear is ended and the engagement of the newly to be engaged transmission ratio step takes place using the primary actuation element.

16. A transmission according to claim 15, wherein when one gear is engaged, at least one gear not engaged is prevented from an unintended engagement using the at least one secondary actuation element if the primary actuation element of the engaged gear remains in the region of the end position, which fixes the engagement of the gear.

17. A transmission according to claim 15, wherein the motion of the primary actuation element for engaging the newly to be engaged transmission ratio step is prevented by a blocking device controlled by the secondary actuation element, whereby the secondary actuation element blocks the blockage device until the engaged transmission ratio step is disengaged.

18. A transmission according to claim 1, wherein the final output mechanisms include connection elements including at least one of shift forks or selector shafts and forks, which have a first functional area for the engagement of a primary actuation element and a second functional area for the engagement of a secondary actuation element.

19. A transmission according to claim 18, in which the at least one secondary actuation element is arranged on a selector shaft rotatable about its longitudinal axis when actuated, and in which the second functional area is constructed such that when the selector shaft is rotated, a force from one secondary actuation element can be transferred to the second functional area in the direction of disengagement of the associated transmission ratio step, which is equal to or greater than the force necessary for disengagement.

20. A transmission according to claim 1, wherein at least one actuation element can be brought into operative connection with one or more final output mechanisms at the same time.

21. A transmission according to claim 20, wherein the at least one secondary actuation element has a breadth in the direction of the selector shaft so that at least two final output mechanisms can be acted upon at the same time.

22. A transmission according to claim 18, wherein the at least one secondary actuation element and the second functional areas interact such that a disengagement of a transmission ratio step takes place when the selector shaft rotates, independent of the direction of rotation of the latter.

23. A transmission in accordance with claim 22, wherein the at least one secondary actuation element and the second functional areas are constructed symmetrically with relation to a plane erected on the selector shaft.

24. A transmission according to claim 22, wherein the at least one secondary actuation element has two cam-like end regions and the second functional regions have recesses corresponding therewith.

25. A transmission according to claim 22, wherein the second functional regions have two cam-like end regions and the at least one secondary actuation element has recesses corresponding therewith.

26. A transmission according to claim 22, wherein the force transmission between secondary actuation element and the second functional area takes place via the tips of cam-like end regions.

27. A transmission according to claim 22, wherein the transmission of force between secondary actuation element and the second functional region takes place via the lateral surfaces of the cam-like end regions.

28. A transmission according to claim 1, wherein at least one transmission actuator unit formed from a shift actuator and a selection actuator is mounted on at least one final output mechanism as a separate subassembly on a pre-assembled transmission having an opening for access to the at least one final output mechanism.

29. A transmission according to claim 1, wherein a transmission actuation unit including a manually actuated selector element and a manually actuated shift element is mounted on at least one final output mechanism as a separate subassembly on a pre-assembled transmission having an opening for access to at least one final output mechanism.

30. A transmission according to claim 28, wherein the opening is utilized for access to the transmission actuator unit and to the transmission actuation unit.

31. A transmission according to claim 28, wherein the transmission actuator unit and the transmission actuation unit use the same final output mechanisms for engaging and disengaging transmission ratio steps.

32. A transmission according to claim 22, wherein the final output mechanism includes a primary actuation element, which engages substantially free of play with the at least one final output element while forming an involute engagement and actuates said at least one final output element.

33. A transmission according to claim 28, wherein the final output mechanism includes a primary actuation element, which engages substantially without play with the at least one final output mechanism and actuates it.

34. A transmission according to claim 33, wherein the substantially play-free engagement is an involute engagement.

35. A transmission according to claim 1, wherein at least one of the at least one primary and secondary actuation elements interacts with at least one final output element while forming an involute engagement.

36. A transmission according to claim 1, wherein the at least one primary and one secondary actuation element are one piece.

37. A transmission according to claim 36, wherein at least one primary actuation element is enclosed along its axis of rotation by two secondary actuation elements and in that primary and secondary actuation elements are constructed in one piece.

38. A transmission according to claim 36, wherein at least one of the primary or secondary actuation elements is one piece with the selector shaft accommodating them.

39. A transmission according to claim 25, wherein the at least one primary actuation element and at least one secondary actuation element exert an involute engagement on a single shift jaw, whereby for the at least one primary actuation element and for the at least one secondary actuation element a separate involute region is provided in each case.

40. A transmission according to claim 1, wherein the engagement of one transmission ratio step takes place according to a linear path relationship between the final output element and a primary actuation element.

41. A transmission according to claim 1, wherein the engagement of a transmission ratio step takes place in accordance with a non-linear path relationship between the final output element and a primary actuation element.

42. A transmission according to claim 1, wherein the disengagement of a transmission ratio step takes place according to a linear relationship between the final output element and a secondary actuation element.

43. A transmission according to claim 1, wherein disengagement of a transmission ratio step takes place in accordance with a non-linear path relationship between the final output element and a secondary actuation element.

44. A transmission according to claim 1, wherein an engagement motion of a transmission ratio step to be engaged and a disengagement motion of a transmission ratio step to be disengaged overlap.

45. A transmission according to claim 1, wherein an engagement motion of a transmission ratio step to be engaged and a disengagement motion of a transmission ratio step to be disengaged do not overlap.

46. A transmission according to claim 1, wherein a selection motion for positioning the at least one primary actuation mechanism on an end output mechanism is a displacement of the at least one primary actuation mechanism along an axis of rotation and a shifting motion is a rotary motion of the at least one primary actuation element about that axis of rotation.

47. A transmission according to claim 1, wherein a selection motion for positioning the at least one primary actuation element on a final output mechanism takes place by means of a rotary motion about an axis of rotation and a shifting motion by means of a displacement along that axis of rotation.

48. A transmission according to claim 47, wherein a final actuation mechanism is constructed such that a hollow shaft rotatable about an axis of rotation has at least one radially outwardly projecting primary actuation element, and that in the hollow shaft a forced control penetrating through slots in the hollow shaft is provided for two secondary actuation elements arranged on the hollow shaft with radially extended impingement facilities for the final output elements, which arranges the secondary actuation elements during a displacement of the hollow shaft along the axis of rotation at a limited distance from one another, whereby the final output mechanisms are arranged across at least one peripheral segment around the axis of rotation of the hollow shaft, and in a first displacement of the hollow shaft within the limited distance the secondary actuation elements disengage an engaged gear, and with a further displacement of the hollow shaft beyond the limited distance the at least one primary actuation element engages a newly to be engaged gear after the at least one primary actuation element and the final output mechanism are brought into the same peripheral position for the new gear to be engaged by means of a rotation of the hollow shaft.

49. A transmission according to claim 48, wherein two primary actuation elements are peripherally positioned and activate a group of final output mechanisms.

50. A transmission according to claim 48, wherein elongated slots are provided in the secondary actuation elements along which the primary actuation elements are guided upon a displacement of the hollow shaft.

51. A transmission according to claim 47, wherein both secondary actuation elements are pre-stressed.

52. A transmission according to claim 1, wherein in the transmission at least one transmission brake is provided for braking a transmission input shaft, which brake is actuated by one of a primary and a secondary actuation element.

53. A transmission according to claim 1, wherein the final output element includes two rotatable actuation elements spaced from each other along an axis of rotation about which they act.

54. A transmission according to claim 1, wherein at least one final output element is tapered from radially inward to radially outward in an area of an operating engagement with at least one of the primary and a secondary actuation element in relation to an axis of rotation of the at least one primary and secondary actuation element that rotates during a shift process.

55. A transmission according to claim 1, wherein, independently of the position of the final output elements, the at least one primary actuation element is movable into a neutral position (N) in which all engaged gears are disengaged through the at least one secondary actuation element.

56. A transmission in accordance with claim 55, wherein the neutral position is reached by means of a selection motion of the at least one primary actuation element beyond the final output elements and a subsequent shifting motion.

57. A transmission according to claim 55, wherein the neutral position (N) is provided in a final output mechanism which actuates only one gear, and a shifting motion for selling the neutral position takes place opposite to a shifting motion for actuation of the final output element.

58. A transmission according to claim 55, wherein the neutral position is reached using a selection motion of the primary actuation element between two final output elements and a subsequent shifting motion.

59. A transmission according to claim 1, wherein a selection process for establishing a position of a final output mechanism for a newly to be engaged transmission ratio step takes place immediately before disengaging an engaged transmission ratio step, and includes engaging the newly to be engaged transmission ratio step during a reduction phase of a drive torque furnished by a drive unit in a power branch of the motor vehicle.

60. A transmission according to claim 1, wherein the transmission includes at least two power branches each having one transmission input shaft, and idler gears rotatable thereon, which are connectable with associated transmission input shafts using the final output mechanisms for shifting gears, whereby during the operation of the motor vehicle using a first transmission input shaft and a shifted gear corresponding to the driving situation, a following gear is engaged with a transmission ratio step fitting the driving situation on a second transmission input shaft.

61. A transmission according to claim 60, wherein the following transmission ratio step is the next higher transmission ratio step in relation to the reduction engaged on the first transmission input shaft.

62. A transmission according to claim 60, wherein, during a standstill of the vehicle, a transmission ratio step is engaged on each of the transmission input shafts by means of which the motor vehicle can be started.

63. A transmission according to claim 62, wherein a transmission ratio step with which the motor vehicle can be started up is a reverse gear or a forward gear.

64. A transmission according to claim 60, wherein when the driving situation changes, the following transmission ratio step is changed.

65. A transmission according to claim 60, wherein, corresponding to the driving situation, a final output mechanism is selected using a primary actuation element, but is not actuated, which corresponds to an alternative transmission ratio step of a following transmission ratio step.

66. A transmission according to claim 65, wherein the alternative transmission ratio step corresponds to a transmission ratio step with greater reduction during a partial load operation of the motor vehicle than that with which the motor vehicle is then being operated, whereby with this greater reduction during full load operation, maximum acceleration of the motor vehicle can be attained.

67. A transmission according to claim 65, wherein the alternative transmission ratio step at a full load operation of the motor vehicle corresponds to a transmission ratio step with a smaller reduction than that with which the motor vehicle is then being operated, whereby with the smaller reduction the motor vehicle is economically operable during partial load operation.

68. A transmission according to claim 59, wherein after a selection of the final output element, at least one of the primary and secondary actuation elements acts upon at least one final output element of a transmission ratio step to be disengaged, and in such manner that a disengagement process of the transmission ratio step to be disengaged only takes place when a torque acting on the final output element connecting an idler gear with a transmission shaft is near zero.

* * * * *